United States Patent
Ichikawa

(10) Patent No.: US 9,531,442 B2
(45) Date of Patent: Dec. 27, 2016

(54) CONTACTLESS POWER TRANSMITTING DEVICE, CONTACTLESS POWER RECEIVING DEVICE, VEHICLE, CONTACTLESS POWER TRANSMITTING AND RECEIVING SYSTEM, METHOD OF CONTROLLING CONTACTLESS POWER TRANSMITTING DEVICE, METHOD OF CONTROLLING CONTACTLESS POWER RECEIVING DEVICE, AND METHOD OF CONTROLLING CONTACTLESS POWER TRANSMITTING AND RECEIVING SYSTEM

(71) Applicant: Shinji Ichikawa, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 619 days.

(21) Appl. No.: 13/932,522

(22) Filed: Jul. 1, 2013

(65) Prior Publication Data
US 2014/0035358 A1 Feb. 6, 2014

(30) Foreign Application Priority Data
Aug. 2, 2012 (JP) ................................. 2012-171832

(51) Int. Cl.
*H04B 5/00* (2006.01)
*B60R 16/03* (2006.01)

(52) U.S. Cl.
CPC ............. *H04B 5/0037* (2013.01); *B60R 16/03* (2013.01); *H04B 5/0093* (2013.01)

(58) Field of Classification Search
CPC ..................................................... H04B 5/0025
See application file for complete search history.

(56) References Cited

U.S. PATENT DOCUMENTS

| | | | | |
|---|---|---|---|---|
| 8,378,524 B2* | 2/2013 | Mita | ..................... | B60L 11/182 307/104 |
| 2011/0156493 A1* | 6/2011 | Bennett | ................... | H02J 17/00 307/104 |
| 2012/0153894 A1* | 6/2012 | Widmer | ............... | H04B 5/0037 320/108 |

(Continued)

FOREIGN PATENT DOCUMENTS

| JP | 59-144231 A | 8/1984 |
|---|---|---|
| JP | 2010-093944 A | 4/2010 |

(Continued)

*Primary Examiner* — Jared Fureman
*Assistant Examiner* — Joel Barnett
(74) *Attorney, Agent, or Firm* — Oliff PLC

(57) ABSTRACT

A contactless power transmitting device that contactlessly transmits electric power to a power receiving device includes a transmitting unit and a power transmission controller. The transmitting unit transmits electric power at a variable transmission frequency. The power transmission controller sets the transmission frequency, based on frequency information concerning a frequency of a broadcast wave that can be received at a position of the contactless power transmitting device. The power transmission controller sets the transmission frequency so that one of the transmission frequency and the frequency of the broadcast wave differs from an integer multiple of the other thereof.

7 Claims, 18 Drawing Sheets

(56) References Cited

U.S. PATENT DOCUMENTS

| | | | |
|---|---|---|---|
| 2013/0002035 A1* | 1/2013 | Oodachi | H02J 5/005 307/104 |
| 2013/0038135 A1 | 2/2013 | Ichikawa | |
| 2014/0008969 A1 | 1/2014 | Kanahara et al. | |

FOREIGN PATENT DOCUMENTS

| | | |
|---|---|---|
| JP | A-2011-135754 | 7/2011 |
| JP | A-2014-014225 | 1/2014 |

* cited by examiner

| REGION | BROADCASTING STATION | FREQUENCY |
|---|---|---|
| 1 | B1 | f1 |
| | B2 | f2 |
| | B3 | f3 |
| 2 | C1 | f4 |
| | C2 | f5 |
| | C3 | f6 |
| ⋮ | ⋮ | ⋮ |

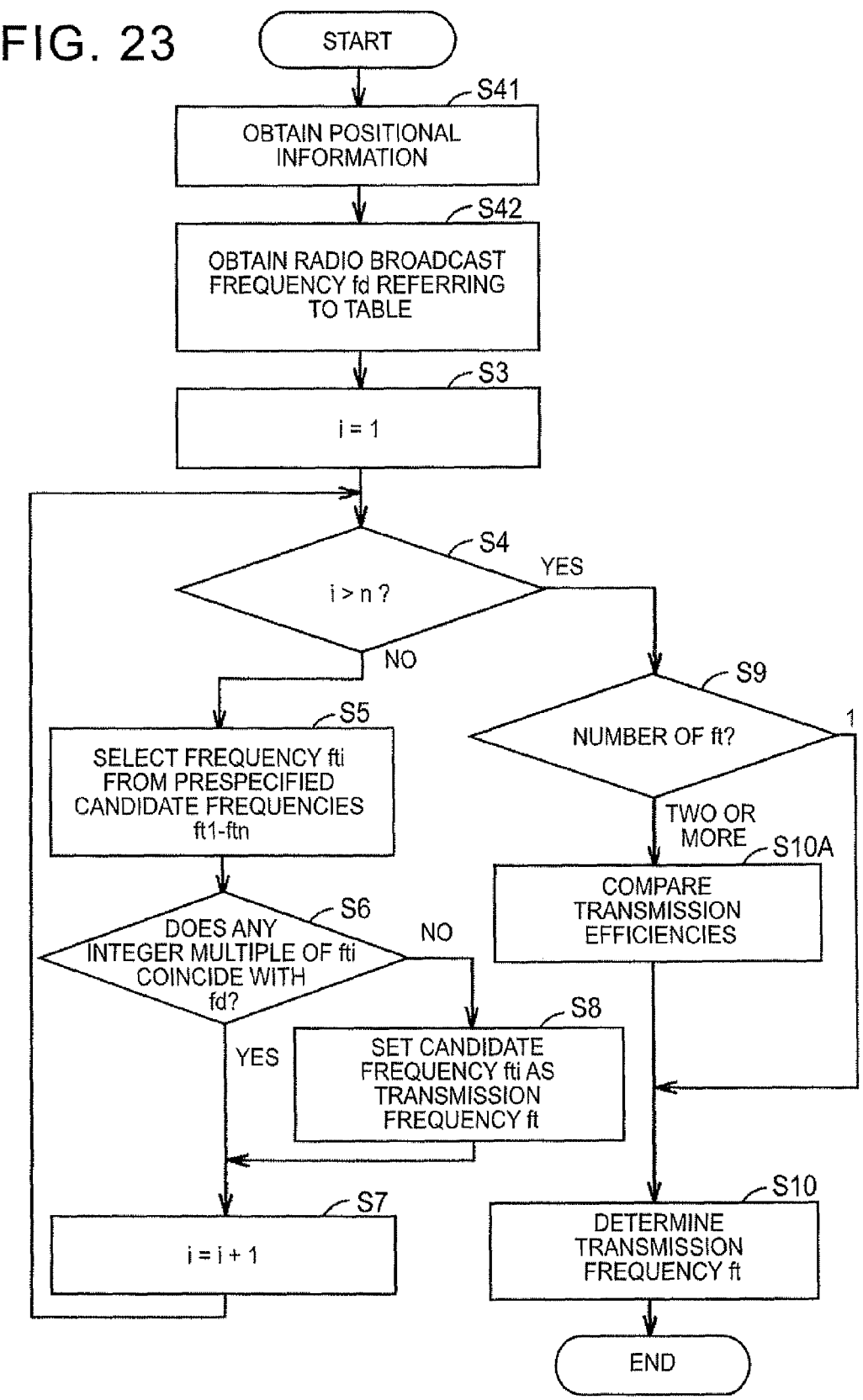

CONTACTLESS POWER TRANSMITTING DEVICE, CONTACTLESS POWER RECEIVING DEVICE, VEHICLE, CONTACTLESS POWER TRANSMITTING AND RECEIVING SYSTEM, METHOD OF CONTROLLING CONTACTLESS POWER TRANSMITTING DEVICE, METHOD OF CONTROLLING CONTACTLESS POWER RECEIVING DEVICE, AND METHOD OF CONTROLLING CONTACTLESS POWER TRANSMITTING AND RECEIVING SYSTEM

INCORPORATION BY REFERENCE

The disclosure of Japanese Patent Application No. 2012-171832 filed on Aug. 2, 2012 including the specification, drawings and abstract is incorporated herein by reference in its entirety.

BACKGROUND OF THE INVENTION

1. Field of the Invention

The invention relates to a contactless power transmitting device, a contactless power receiving device, a vehicle, a contactless power transmitting and receiving system, a method of controlling a contactless power transmitting device, a method of controlling a contactless power receiving device, and a method of controlling a contactless power transmitting and receiving system.

2. Description of Related Art

For example, Japanese Patent Application Publication No. 2011-135754 (JP 2011-135754 A) discloses a contactless power transfer technology applied to an electrically-driven vehicle, such as an electric vehicle and a hybrid vehicle. According to the disclosed technology, one or both of a power transmitting device and a power receiving device include(s) a coil case, and a shield member that covers the coil case. In operation, electric power is transmitted from the power transmitting device to the power receiving device, at a frequency that is adjusted, depending on the distance between the coil unit and the shield.

When a wireless device is located around the power transmitting device or power receiving device, a countermeasure may be required to be taken so as to avoid an influence on the operation of the wireless device during transmission of electric power. For example, noise generated by the power transmitting device may have an influence on the operation of a receiver that receives broadcast waves. For example, the noise may have an influence on demodulation performed by the receiver.

Frequency bands (i.e., channels) used by broadcast waves may differ from one region to another. At the time when the power transmitting device is manufactured, the position at which the power transmitting device will be installed may not be determined. Accordingly, it is difficult to set the transmission frequency of the power transmitting device so that the noise does not interfere with the broadcast waves, irrespective of the installation position of the power transmitting device.

SUMMARY OF THE INVENTION

The invention provides a technology for minimizing an influence of a contactless power transmitting device on the operation of a broadcast receiver.

According to a first aspect of the invention, a contactless power transmitting device that contactlessly transmits electric power to a power receiving device includes a transmitting unit configured to transmit electric power at a variable transmission frequency, and a power transmission controller configured to set the transmission frequency, based on frequency information concerning a frequency of a broadcast wave that can be received at a position of the contactless power transmitting device. The power transmission controller is configured to set the transmission frequency so that one of the transmission frequency and the frequency of the broadcast wave is different from an integer multiple of the other of the transmission frequency and the frequency of the broadcast wave.

The contactless power transmitting device may further include a receiver configured to receive the broadcast wave, and the power transmission controller may be configured to perform a frequency searching operation using the receiver, and obtain the frequency information based on a strength of the broadcast wave received by the receiver.

The contactless power transmitting device may further include a communication unit configured to receive the frequency information transmitted from the power receiving device, and transmit the received frequency information to the power transmission controller.

The contactless power transmitting device may further include a positional information obtaining unit configured to obtain positional information concerning a position of the contactless power transmitting device. The power transmission controller may be configured to obtain the frequency information, based on information that associates a position at which the broadcast wave is received with the frequency of the broadcast wave, and the positional information.

The power transmission controller may be configured to set the transmission frequency so that a noise frequency corresponding to an integer multiple of the transmission frequency differs from the frequency of the broadcast wave.

In the presence of a plurality of candidate frequencies each of which can be set as the transmission frequency, the power transmission controller may be configured to determine one of the candidate frequencies as the transmission frequency, based on an efficiency of transmission between the contactless power transmitting device and the power receiving device.

According to a second aspect of the invention, a contactless power receiving device that contactlessly receives electric power transmitted from a power transmitting device includes a power receiving controller configured to obtain frequency information concerning a frequency of a broadcast wave that can be received at a position of the contactless power receiving device, a communication unit configured to transmit the frequency information obtained by the power receiving controller, to the power transmitting device, and a power receiving unit configured to contactlessly receive electric power transmitted from the power transmitting device at a transmission frequency determined according to the frequency information. The transmission frequency may be determined so that one of the transmission frequency and the frequency of the broadcast wave differs, from an integer multiple of the other of the transmission frequency and the frequency of the broadcast wave.

The contactless power receiving device may further include a receiver configured to receive the broadcast wave. The power receiving controller may be configured to perform a frequency searching operation using the receiver, before the power transmitting device transmits electric power, and obtain the frequency information based on a strength of the broadcase wave received by the receiver.

The contactless power receiving device may further include a positional information obtaining unit configured to obtain positional information concerning a position of the contactless power receiving device. Before the power transmitting device transmits electric power, the power receiving controller may be configured to obtain the frequency information, based on information that associates a position at which the broadcast wave is received with the frequency of the broadcast wave, and the positional information.

According to a third aspect of the invention, a vehicle including the contactless power receiving device as described above is provided.

According to a fourth aspect of the invention, a contactless power transmitting and receiving system includes a power transmitting device configured to transmit electric power at a variable transmission frequency, and a power receiving device configured to contactlessly receive electric power transmitted from the power transmitting device. The power transmitting device is configured to set the transmission frequency, based on frequency information concerning a frequency of a broadcast wave that can be received at a position of the power transmitting device, so that one of the transmission frequency and the frequency of the broadcast wave differs from an integer multiple of the other of the transmission frequency and the frequency of the broadcast wave.

The power transmitting device may include a transmitting unit configured to transmit electric power at the transmission frequency, and a power transmission controller configured to obtain the frequency information, and set the transmission frequency based on the frequency information.

The power transmitting device may further include a receiver configured to receive the broadcast wave. The power transmission controller may be configured to perform a frequency searching operation using the receiver, and obtain the frequency information based on a strength of the broadcast wave received by the receiver.

The power receiving device may include a power receiving controller configured to obtain the frequency information, and a first communication unit configured to transmit the frequency information obtained by the power receiving controller, to the power transmitting device. The power transmitting device may further include a second communication unit configured to receive the frequency information transmitted from the first communication unit, and transmit the received frequency information to the power transmission controller.

The power receiving device may further include a receiver configured to receive the broadcast wave. The power receiving controller may be configured to perform a frequency searching operation using the receiver, and obtain the frequency information based on a strength of the broadcast wave received by the receiver.

The power receiving device may further include a positional information obtaining unit configured to obtain positional information concerning a position of the power receiving device. The power receiving controller may be configured to obtain the frequency information, based on information that associates a position at which the broadcast wave is received with the frequency of the broadcast wave, and the positional information.

The power transmitting device may further include a positional information obtaining unit configured to obtain positional information concerning the position of the power transmitting device. The power transmission controller may be configured to obtain the frequency information, based on information that associates a position at which the broadcast wave is received with the frequency of the broadcast wave, and the positional information.

The power transmission controller may be configured to set the transmission frequency so that a noise frequency corresponding to an integer multiple of the transmission frequency differs from the frequency of the broadcast wave.

In the presence of a plurality of candidate frequencies each of which can be set as the transmission frequency, the power transmission controller may be configured to determine one of the candidate frequencies as the transmission frequency, based on an efficiency of transmission between the power transmitting device and the power receiving device.

According to a fifth aspect of the invention, a method of controlling a contactless power transmitting device that contactlessly transmits electric power to a power receiving device includes the steps of transmitting electric power at a variable transmission frequency, and setting the transmission frequency, based on frequency information concerning a frequency of a broadcast wave that can be received at a position of the contactless power transmitting device. The transmission frequency is set so that one of the transmission frequency and the frequency of the broadcast wave differs from an integer multiple of the other of the transmission frequency and the frequency of the broadcast wave.

According to a sixth aspect of the invention, a method of controlling a contactless power receiving device that contactlessly receives electric power transmitted from a power transmitting device includes the steps of obtaining frequency information concerning a frequency of a broadcast wave that can be received at a position of the contactless power receiving device, transmitting the obtained frequency information to the power transmitting device, and contactlessly receiving electric power transmitted from the power transmitting device at a transmission frequency determined according to the frequency information. The transmission frequency is determined so that one of the transmission frequency and the frequency of the broadcast wave differs from an integer multiple of the other of the transmission frequency and the frequency of the broadcast wave.

According to a seventh aspect of the invention, a method of controlling a contactless power transmitting and receiving system includes the steps of transmitting electric power from a power transmitting device at a variable transmission frequency, and contactlessly receiving, at a power receiving device, the electric power transmitted from the power transmitting device. The transmission frequency is set based on frequency information concerning a frequency of a broadcast wave that can be received at a position of the power transmitting device, so that one of the transmission frequency and the frequency of the broadcast wave differs from an integer multiple of the other of the transmission frequency and the frequency of the broadcast wave.

According to the invention, it is possible to reduce an influence of the contactless transmitting device on the operation of the broadcast receiver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 23 is a flowchart illustrating a process of setting a transmission frequency, according to the fourth embodiment of the invention.

DETAILED DESCRIPTION OF EMBODIMENTS

Figure 1:
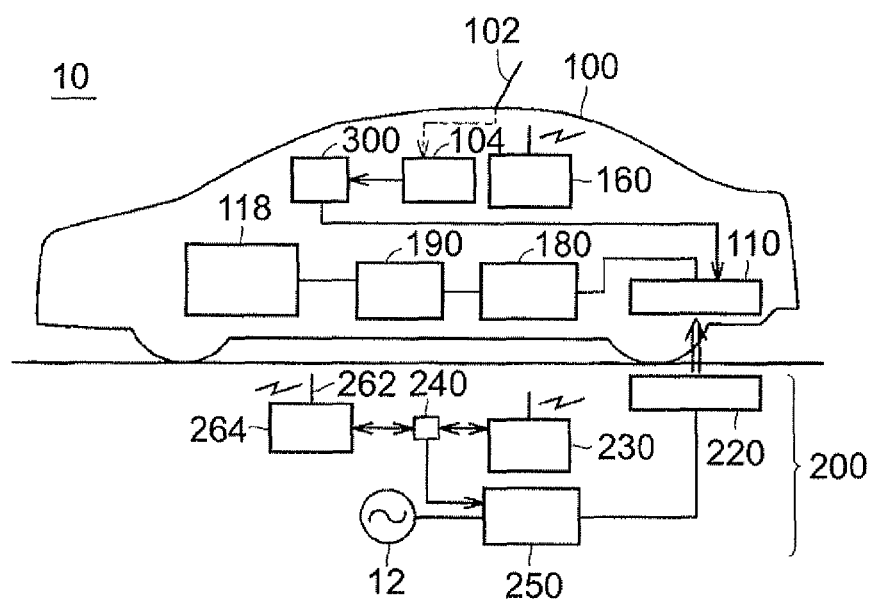
FIG. 1 is an overall block diagram showing one example of contactless power transmitting and receiving system according to a first embodiment of the invention.

Some embodiments of the invention will be described in detail with reference to the drawings. In the drawings, the same reference numerals are assigned to the same or corresponding components, elements or portions, of which explanation will not be repeated.

[First Embodiment] FIG. 1 is an overall block diagram showing one example of contactless power transmitting and receiving system according to a first embodiment of the invention. Referring to FIG. 1, the contactless power transmitting and receiving system 10 includes a power transmitting device 200 and a vehicle 100. The vehicle 100 includes a power receiving device as a part of the contactless power transmitting and receiving system 10.

In this embodiment, an electric vehicle is illustrated as an example of vehicle 100. The electric vehicle uses a rotating electrical machine as a driving source. The vehicle 100 may be any type of vehicle provided that it is able to receive electric power in a contactless manner. Thus, the vehicle 100 is not limited to the electric vehicle. Further, in the contactless power, transmitting and receiving system according to the invention, the power receiving device is not limited to the one installed on the vehicle.

The power transmitting device 200 includes a power supply unit 250, a power transmitting unit 220, a communication unit 230, an antenna 262, and a receiver 264. The power supply unit 250 and the power transmitting unit 220 provide the "transmission unit" included in the power transmitting device according to the invention. The "transmission unit" need not be divided into the power supply unit 250 and the power transmitting unit 220. The power transmitting device may include a transmission unit into which the power supply unit 250 and the power transmitting unit 220 are integrated.

The power supply unit 250 receives electric power from a power supply 12, and produces high-frequency AC power. The power supply 12 may be a commercial power supply, or an independent power supply device. The power transmitting unit 220 receives the high-frequency AC power from the power supply unit 250, and transmits electric power to a power receiving unit 110 in a contactless manner. As one example, the power transmitting unit 220 consists of a resonance circuit including a coil and a capacitor.

The vehicle 100 includes an antenna 102, a receiver 104, the above-mentioned power receiving unit 110, a vehicle ECU (Electronic Control Unit) 300, a rectifier 180, an electric power storage device 190, and a power generating device 118. The power receiving unit 110 contactlessly receives electric power transmitted from the power transmitting unit 220 of the power transmitting device 200. The power receiving unit 110 delivers the electric power to the rectifier 180. As one example, the power receiving unit 110 consists of a resonance circuit including a coil and a capacitor.

The rectifier 180 converts the AC power received from the power receiving unit 110 into DC power, and delivers the resulting DC power to the power storage device 190. As a result, the power storage device 190 is charged with the DC power. The power storage device 190 also stores electric power generated by the power generating device 118, as well as the electric power delivered from the rectifier 180. Then, the power storage device 190 supplies the stored electric power to the power generating device 118. A large-capacity capacitor may be employed as the power storage device 190.

The power generating device 118 generates driving force for running the vehicle 100, using electric power stored in the power storage device 190. Although not particularly illustrated in FIG. 1, the power generating device 118 includes, for example, an inverter that receives electric power from the power storage device 190, a motor driven by the inverter, drive wheels driven by the motor, and so forth. The power generating device 118 may include a generator for charging the power storage device 190, and an engine capable of driving the generator.

In the contactless power transfer system, the natural frequency of the power transmitting unit 220 of the power transmitting device 200 is equal to the natural frequency of the power receiving unit 110 of the vehicle 100. Here, the natural frequency of the power transmitting unit 220 (power receiving unit 110) means an oscillation frequency of an electric circuit (resonance circuit) that constitutes the power transmitting unit 220 (power receiving unit 110) when it oscillates freely. The natural frequency that appears when the braking force or electric resistance is made equal or substantially equal to zero, in the electric circuit (resonance circuit) that constitutes the power transmitting unit 220 (power receiving unit 110), is also called "resonance frequency" of the power transmitting unit 220 (power receiving unit 110).

The natural frequency is said to be "equal" not only in the case where the natural frequency of the power transmitting unit 220 is exactly equal to that of the power receiving unit 110, but also in the case where these natural frequencies are substantially equal to each other. The natural frequencies are substantially equal to each other, for example, when a difference between the natural frequency of the power transmitting unit 220 and that of the power receiving unit 110 is within 10% of the natural frequency of the power transmitting unit 220 or the power receiving unit 110.

In the power transfer system according to this embodiment, a difference between the natural frequency of the power transmitting unit 220 and the natural frequency of the power receiving unit 110 is equal to or smaller than 10% of the natural frequency of the power receiving unit 110 or the power transmitting unit 220. The electric power transmission efficiency can be enhanced by setting the natural frequencies of the power transmitting unit 220 and power receiving unit 110 to within this range. On the other hand, if the difference in the natural frequency is larger than 10% of the natural frequency of the power receiving unit 110 or the power transmitting unit 220, the electric power transmission efficiency is reduced to be lower than 10%, and the charging time of the power storage device 190 may be prolonged.

The power transmitting unit 220 contactlessly transmits electric power to the power receiving unit 110 of the vehicle 100, through at least one of a magnetic field that is formed between the power transmitting unit 220 and the power receiving unit 110 and oscillates at a particular frequency, and an electric field that is formed between the power transmitting unit 220 and the power receiving unit 110 and oscillates at a particular frequency. The coupling coefficient κ between the power transmitting unit 220 and the power receiving unit 110 is, for example, about 0.3 or smaller, preferably, 0.1 or smaller. As a matter of course, the coupling coefficient κ may be selected from values within the range of about 0.1 to 0.3. The coupling coefficient κ is not limited to such values, but may be selected from various values that assure good power transmission. Also, the power transmitting unit 220 and the power receiving unit 110 may be designed so that the product of the coupling coefficient κ and the Q value representing the resonance strength becomes equal to or larger than a predetermined value (e.g., 1.0).

Thus, the power transmitting unit 220 and the power receiving unit 110 are resonated via an electromagnetic field, so that electric power is contactlessly transmitted from the power transmitting unit 220 of the power transmitting device 200 to the power receiving unit 110 of the vehicle 100.

As described above, in the contactless power transfer system, the power transmitting unit 220 and the power receiving unit 110 are resonated via the electromagnetic field, so that electric power is contactlessly transmitted from the power transmitting unit 220 to the power receiving unit 110. The coupling between the power transmitting unit 220 and the power receiving unit 110 in the electric power transmission may be called, for example, "magnetic resonance coupling", "magnetic field resonance coupling", "near field resonance coupling", "electromagnetic field resonance coupling", "electric field resonance coupling", or the like. The "electromagnetic field resonance coupling" means coupling including all of the "magnetic resonance coupling", "magnetic field resonance coupling", and "electric field resonance coupling".

When the power transmitting unit 220 and the power receiving unit 110 are formed by coils as described above, the power transmitting unit 220 and the power receiving unit 110 are coupled mainly by a magnetic field, and "magnetic resonance coupling" or "magnetic field resonance coupling" is formed. An antenna, such as a meander line antenna, may be employed for each of the power transmitting unit 220 and the power receiving unit 110. In this case, the power transmitting unit 220 and the power receiving unit 110 are coupled mainly by an electric field, and "electric field resonance coupling" is formed.

Figure 2:
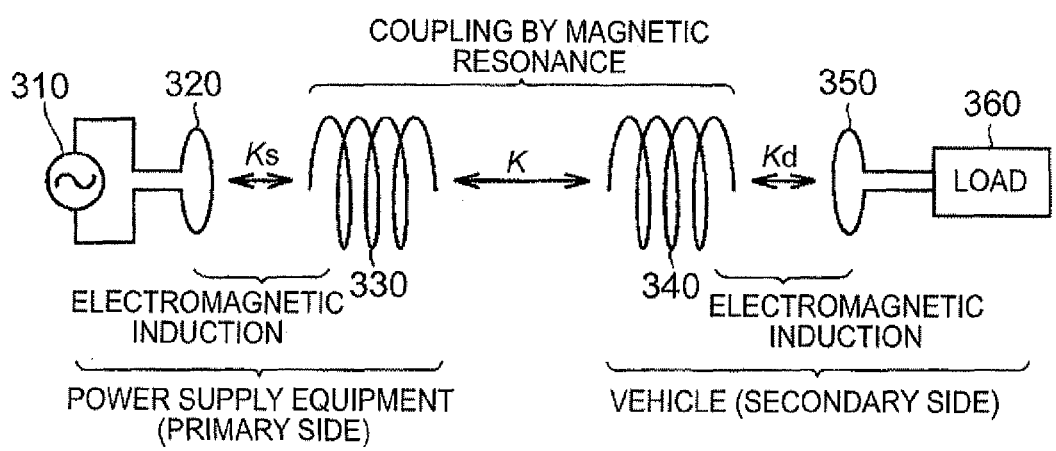
FIG. 2 is a schematic view useful for explaining the principle of power transmission by a resonance method.

FIG. 2 is a schematic view useful for explaining the principle of power transmission by a resonance method. Referring to FIG. 2, in the resonance method, two LC resonance coils having the same natural frequency resonate in an electromagnetic field (near field), in the same manner as that in which two tuning forks resonate, so that electric power is transmitted from one of the coils to the other coil via the electromagnetic field.

More specifically, a primary coil 320 is connected to a high-frequency power supply 310, and high-frequency electric power is supplied to a primary self-resonant coil 330 magnetically coupled to the primary coil 320 by electromagnetic induction. The primary self-resonant coil 330 is an LC resonator that contains inductance of the coil itself and floating capacitance, and resonates with a secondary self-resonant coil 340 having the same resonance frequency as that of the primary self-resonant coil 330, via an electromagnetic field (near field). As a result, energy (electric power) is transferred from the primary self-resonant coil 330 to the secondary self-resonant coil 340 via the electromagnetic field. The energy (electric power) transferred to the secondary self-resonant coil 340 is taken out by a secondary coil 350 magnetically coupled to the secondary self-resonant coil 340 by electromagnetic induction, and is supplied to a load 360. The power transmission by the resonance method is realized when the Q value indicative of the resonance strength between the primary self-resonant coil 330 and the secondary self-resonant coil 340 is larger than, for example, 100.

In the power transmitting and receiving system according to this embodiment, the power transmitting unit and the power receiving unit are resonated by an electromagnetic field, so that electric power is transmitted from the power transmitting unit to the power receiving unit, and the coupling coefficient (κ) between the power transmitting unit and the power receiving unit is, for example, about 0.3 or smaller, preferably, 0.1 or smaller. As a matter of course, the coupling coefficient κ may be selected from values within the range of about 0.1 to 0.3. The coupling coefficient κ is not limited to such values, but may be selected from various values that assure good power transmission. Generally, in the electric power transmission utilizing electromagnetic induction, the coupling coefficient (κ) between the power transmitting unit and the power receiving unit is close to 1.0.

Regarding the correspondence relationship between FIG. 2 and FIG. 1, the secondary self-resonant coil 340 and the secondary coil 350 correspond to the power receiving unit 110 of FIG. 1, and the primary coil 320 and the primary self-resonant coil 330 correspond to the power transmitting unit 220 of FIG. 1.

Figure 3:
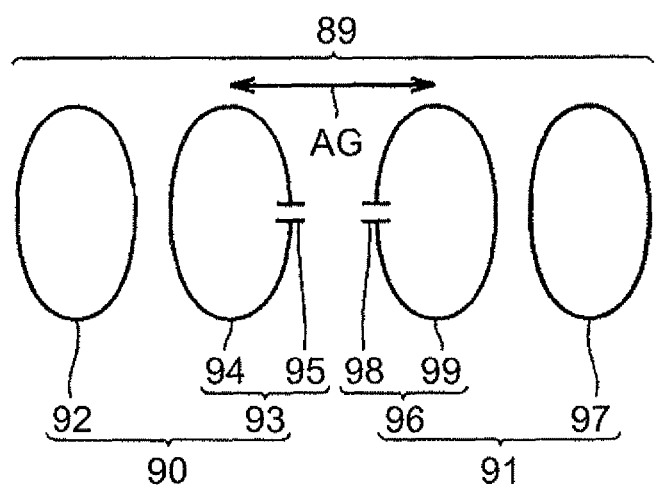
FIG. 3 is a view showing a simulation model of a power transfer system.
Figure 4:
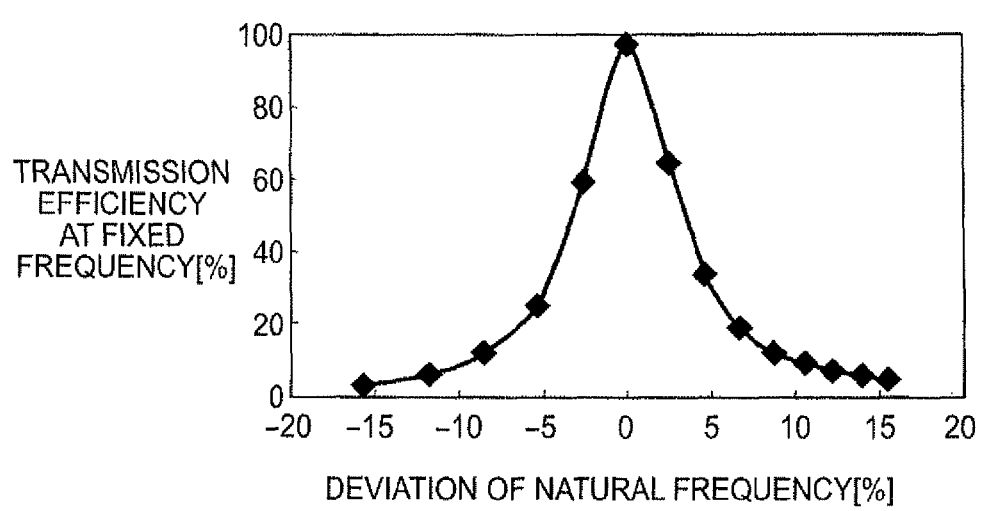
FIG. 4 is a graph indicating the relationship between a deviation of the natural frequency between a power transmitting unit and a power receiving unit, and the power transmission efficiency.

Referring next to FIG. 3 and FIG. 4, the simulation result obtained by analyzing the relationship between a difference in the natural frequency and the power transmission efficiency will be explained. FIG. 3 shows a simulation model of a power transfer system. The power transfer system 89 includes a power transmitting unit 90 and a power receiving unit 91, and the power transmitting unit 90 includes an electromagnetic induction coil 92 and a power transmitting unit 93. The power transmitting unit 93 includes a resonance coil 94, and a capacitor 95 provided in the resonance coil 94.

The power receiving unit 91 includes a power receiving unit 96 and an electromagnetic induction coil 97. The power receiving unit 96 includes a resonance coil 99, and a capacitor 98 connected to the resonance coil 99.

The inductance of the resonance coil 94 is denoted as inductance Lt, and the capacitance of the capacitor 95 is denoted as capacitance C1. The inductance of the resonance coil 99 is denoted as inductance Lr, and the capacitance of the capacitor 98 is denoted as capacitance C2. Where respective parameters are set in this manner, the natural frequency f1 of the power transmitting unit 93 is expressed by the following equation (1), and the natural frequency f2 of the power receiving unit 96 is expressed by the following equation (2).

$$f1 = 1/\{2\pi(Lt \times C1)^{1/2}\} \quad (1)$$

$$f2 = 1/\{2\pi(Lr \times C2)^{1/2}\} \quad (2)$$

FIG. 4 indicates the relationship between a deviation of the natural frequency between the power transmitting unit 93 and the power receiving unit 96, and the power transmission efficiency. FIG. 4 shows the case where the inductance Lr and the capacitances C1, C2 are fixed, and only the inductance Lt is changed.

In this simulation, the relative positional relationship between the resonance coil 94 and the resonance coil 99 is fixed, and the frequency of current supplied to the power transmitting unit 93 is constant.

In the graph shown in FIG. 4, the horizontal axis indicates a deviation (%) of the natural frequency, and the vertical axis indicates the transmission efficiency (5) at a given frequency. The deviation (%) of the natural frequency is expressed by the following equation (3)

$$\text{(Deviation of Natural Frequency)} = \{(f1-f2)/f2\} \times 100 \; (\%) \quad (3)$$

As is apparent from FIG. 4, when the deviation (%) of the natural frequency is ±0%, the power transmission efficiency is approximately equal to 100%. When the deviation (%) of the natural frequency is ±5%, the power transmission efficiency is close to 40%. When the deviation (%) of the natural frequency is ±10%, the power transmission efficiency is close to 10%. When the deviation (%) of the natural frequency is ±15%, the power transmission efficiency is close to 5%. Thus, it will be understood that the power transmission efficiency can be enhanced by setting the natural frequencies of the power transmitting unit and power receiving unit so that an absolute value of the deviation (%) of the natural frequency (difference in the natural frequency) falls within the range of 10% or smaller of the natural frequency of the power receiving unit 96. As a simulation software, an electromagnetic analysis software (JMAG (registered trademark) manufactured by JSOL Corporation) is employed.

Here, a magnetic field of a particular frequency formed around the resonance coil in the power transmitting unit 220 of FIG. 1 will be explained. Typically, the "magnetic field of a particular frequency" has a relationship with the power transmission efficiency and the frequency of current supplied to the resonance coil in the power transmitting unit 220. Initially, the relationship between the power transmission efficiency and the frequency of current supplied to the resonance coil in the power transmitting unit 220 will be explained. The power transmission efficiency with which electric power is transmitted from the resonance coil in the power transmitting unit 220 to the resonance coil in the power receiving unit 110 varies depending on various factors, such as a distance between the resonance coil in the power transmitting unit 220 and the resonance coil in the power receiving unit 110. For example, the natural frequency (resonance frequency) of the power transmitting unit 220 and the power receiving unit 110 is denoted as natural frequency f0, and the frequency of electric current supplied to the resonance coil in the power transmitting unit 220 is denoted as frequency f3, while an air gap between the resonance coil in the power receiving unit 110 and the resonance coil in the power transmitting unit 220 is denoted as air gap AG.

Figure 5:
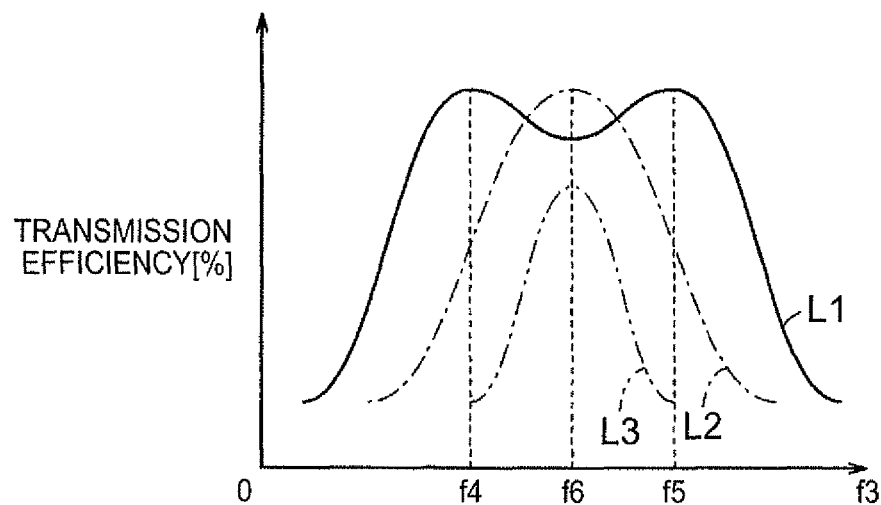
FIG. 5 is a graph indicating the relationship between the power transmission efficiency when the air gap AG is varied in a condition where the natural frequency f0 is fixed, and the frequency f3 of current supplied to a resonance coil in a power transmitting unit of FIG. 1.

FIG. 5 is a graph indicating the relationship between the power transmission efficiency when the air gap AG is varied in a condition where the natural frequency f0 is fixed, and the frequency f3 of current supplied to the resonance coil in the power transmitting unit 220 of FIG. 1.

In the graph shown in FIG. 5, the horizontal axis indicates the frequency f3 of current supplied to the resonance coil in the power transmitting unit 220, and the vertical axis indicates the power transmission efficiency (%). An efficiency curve L1 schematically represents the relationship between the power transmission efficiency when the air gap AG is small, and the frequency f3 of current supplied to the resonance coil in the power transmitting unit 220. When the air gap AG is small, the power transmission efficiency peaks at frequencies f4, f5 (f4<f5), as indicated by the efficiency curve L1. As the air gap AG is increased, the two peaks of the power transmission efficiency become close to each other. Then, the air gap AG is increased to be larger than a given distance, only one peak appears in the power transmission efficiency, and the peak of the power transmission efficiency arises when the frequency of current supplied to the resonance coil in the power transmitting unit 220 is equal to frequency f6, as indicated by the efficiency curve L2 in FIG. 5. As the air gap AG is further increased to be larger than that of the condition of the efficiency curve L2, the peak of the power transmission efficiency is reduced as indicated by the efficiency curve L3 in FIG. 5.

For example, a first method as follows may be considered as a method for improving the power transmission efficiency. As the first method, the frequency of current supplied to the resonance coil in the power transmitting unit 220 shown in FIG. 1 is made constant, in accordance with the air gap AG, and the capacitance of the capacitor is changed, so that the efficiency of power transmission between the power transmitting unit 220 and the power receiving unit 110 is changed. More specifically, in a condition where the frequency of current supplied to the resonance coil in the power transmitting unit 220 is constant, the capacitance of the capacitor is adjusted so that the power transmission efficiency reaches a peak. In this method, the frequency of current flowing through the resonance coil in the power transmitting unit 220 and the resonance coil in the power receiving unit 110 is constant, irrespective of the magnitude of the air gap AG. As a method for changing the power transmission efficiency, a method using the rectifier provided between the power transmitting unit 220 and the power supply unit 250, or a method using a power-receiving-side converter may also be employed.

As a second method, the frequency of current supplied to the resonance coil in the power transmitting unit 220 is adjusted, based on the magnitude of the air gap AG. For example, when a power transmission characteristic as represented by the efficiency curve L1 in FIG. 5 is provided, electric current of frequency f4 or frequency f5 is supplied to the resonance coil in the power transmitting unit 220. When a frequency characteristic or power transmission characteristic as represented by the efficiency curve L2, L3 is provided, electric current of frequency f6 is supplied to the resonance coil in the power transmitting unit 220. In this case, the frequency of the current that flows through the resonance coil in the power transmitting unit 220 and the resonance coil in the power receiving unit 110 is changed in accordance with the magnitude of the air gap AG.

In the first method, the frequency of current flowing through the resonance coil in the power transmitting unit 220 is a fixed, constant frequency. In the second method, the frequency of current flowing through the resonance coil in the power transmitting unit 220 is changed as needed according to the air gap AG. According to the first method or second method, electric current of a particular frequency that is set so as to provide a high power transmission efficiency is supplied to the resonance coil in the power transmitting unit 220. With the current of the particular frequency flowing through the resonance coil in the power transmitting unit 220, a magnetic field (electromagnetic field) that oscillates at a particular frequency is formed around the resonance coil in the power transmitting unit 220. The power receiving unit 110 receives electric power from the power transmitting unit 220, through a magnetic field that is formed between the power receiving unit 110 and the power transmitting unit 220 and oscillates at a particular frequency. Accordingly, the "magnetic field that oscillates at a particular frequency" is not necessarily limited to a magnetic field of a fixed frequency. While the frequency of current supplied to the resonance coil in the power transmitting unit 220 is set, focusing on the air gap AG, in the above example, the power transmission efficiency also changes due to other factors, such as a horizontal deviation between the resonance coil in the power transmitting unit 220 and the resonance coil in the power receiving unit 110; thus, the frequency of current supplied to the resonance coil in the power transmitting unit 220 may be adjusted, based on the other factors.

Figure 6:
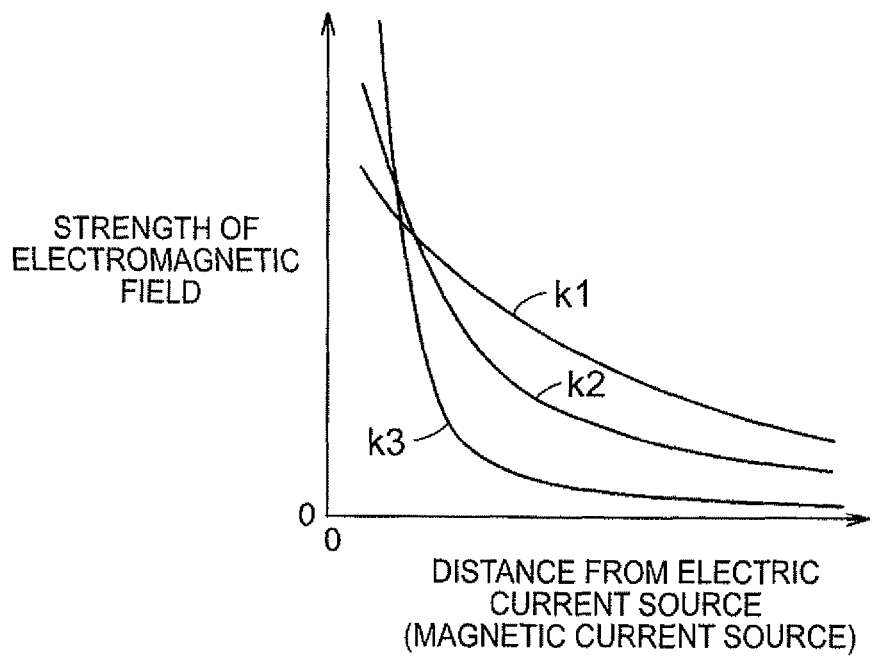
FIG. 6 is a graph indicating the relationship between the distance from an electric current source or a magnetic current source, and the strength of an electromagnetic field.

In the power transfer system according to this embodiment of the invention, an attempt to improve the power transmitting and power receiving efficiencies is made, by using a near field (evanescent field) in which an "electrostatic magnetic field" of the electromagnetic field is dominant. FIG. 6 shows the relationship between the distance from an electric current source or magnetic current source, and the strength of the electromagnetic field. Referring to FIG. 6, the magnetic field consists of three components. Curve k1 is a component that is inversely proportional to the distance from a wave source (electric current source or magnetic current source), and is called "radiation electromagnetic field". Curve k2 is a component that is inversely proportional to the square of the distance from the wave source, and is called "induction electromagnetic field". Curve k3 is a component that is inversely proportional to the cube of the distance from the wave source, and is called "electrostatic magnetic field". Where the wavelength of the electromagnetic field is denoted as "λ", the distance at which the strengths of the "radiation electromagnetic field", "induction electromagnetic field", and "electrostatic magnetic field" are approximately equal may be expressed by λ/2π.

The "electrostatic magnetic field" is a region in which the strength of electromagnetic wave is rapidly reduced as the distance from the wave source increases. In the power transfer system according to this embodiment, energy (electric power) is transferred, using a near field (evanescent field) in which the "electrostatic magnetic field" is dominant. Namely, energy (electric power) is transmitted from the power transmitting unit 220 to the other power receiving unit 110, by resonating the power transmitting unit 220 and the power receiving unit 110 (e.g., a pair of LC resonance coils) having approximately equal natural frequencies, in the near field in which the "electrostatic magnetic field" is dominant. Since energy does not propagate far in the "electrostatic magnetic field", it is possible, by the resonance method, to transmit electric power with a reduced energy loss, as compared with an electromagnetic wave that transmits energy (electric power) through the "radiation electromagnetic field" in which energy propagates far.

Thus, in the power transfer system, the power transmitting unit and the power receiving unit are resonated by an electromagnetic field, so that electric power is contactlessly transmitted between the power transmitting unit and the power receiving unit. The electromagnetic field formed between the power receiving unit and the power transmitting unit may be, for example, a near-field resonance coupling field. The coupling coefficient κ between the power transmitting unit and the power receiving unit is, for example, about 0.3 or smaller, preferably, 0.1 or smaller. As a matter of course, the coupling coefficient κ may be selected from values within the range of about 0.1 to 0.3. The coupling coefficient κ is not limited to such values, but may be selected from various values that assure good power transmission.

Figure 7:
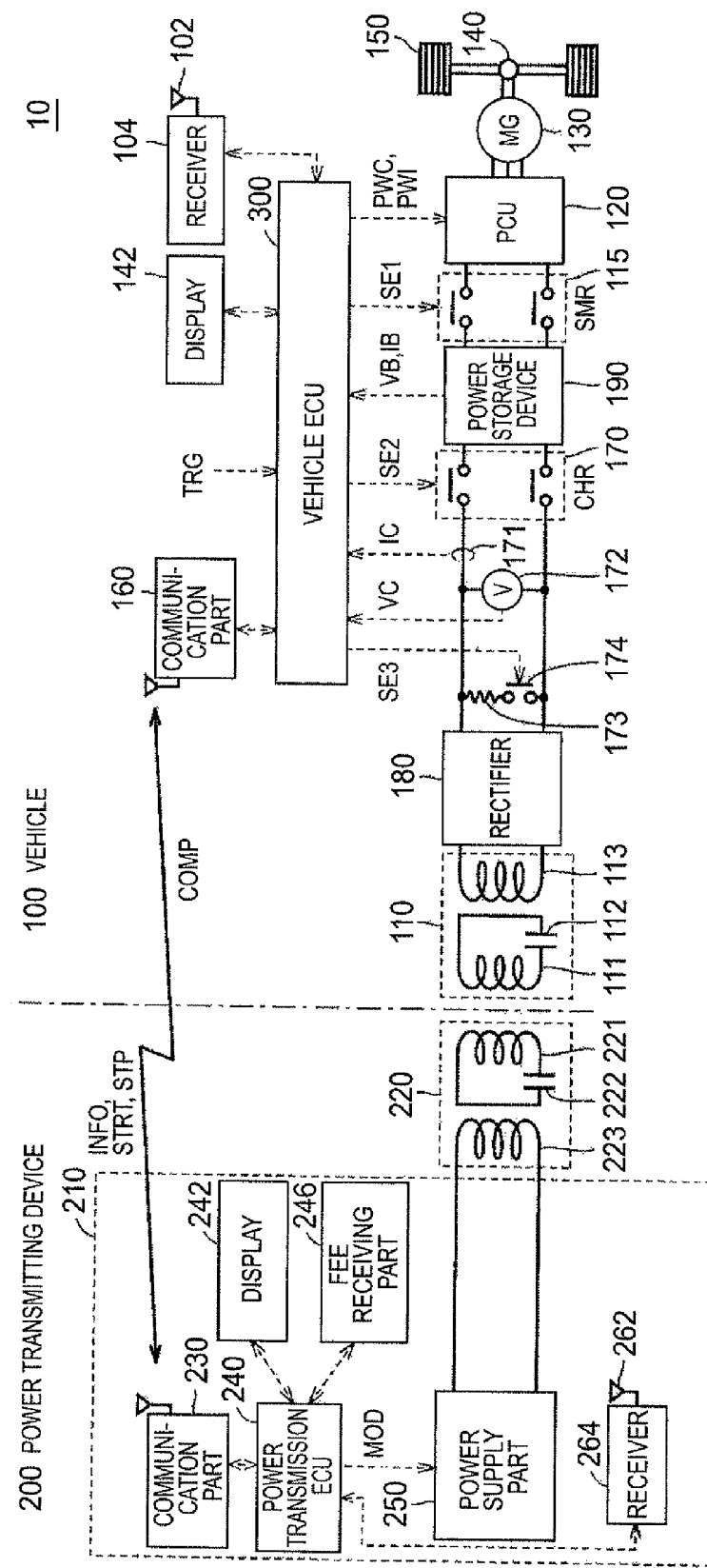
FIG. 7 is a circuit diagram showing the detailed configuration of the contactless power transmitting and receiving system shown in FIG. 1.

FIG. 7 is a circuit diagram showing the detailed configuration of the contactless power transmitting and receiving system 10 shown in FIG. 1. Referring to FIG. 7, the vehicle 100 includes a rectifier 180, a charging relay (CHR) 170, a power storage device 190, a system main relay (SMR) 115, a power control unit (PCU) 120, a motor generator 130, a power transmission gear 140, drive wheels 150, a vehicle ECU (Electronic Control Unit) 300 as a controller, a current sensor 171, and a voltage sensor 172, in addition to the power receiving unit 110 and the communication unit 160. The power receiving unit 110 includes a coil (which will be called "secondary self-resonant coil 111", and may also be called "resonance coil" or the like when appropriate), a capacitor 112, and a secondary coil 113.

In this embodiment, an electric vehicle is taken as an example of the vehicle 100. However, the construction of the vehicle 100 is not limited to that of the electric vehicle provided that the vehicle is able to run, using electric power stored in a power storage device. Other examples of the vehicle 100 include a hybrid vehicle on which an engine is installed, and a fuel-cell car on which a fuel cell is installed.

The secondary self-resonant coil 111 receives electric power from the primary self-resonant coil 221 included in the power transmitting device 200, by electromagnetic resonance using an electromagnetic field.

The number of turns of the secondary self-resonant coil 111 and the distance between the coils are appropriately set, so that the Q value indicative of the strength of resonance between the primary self-resonant coil 221 and the secondary self-resonant coil 111 becomes large (for example, Q>100), and the coupling coefficient (κ) indicative of the degree of coupling becomes small (e.g., 0.3 or smaller, preferably, 0.1 or smaller), based on the distance from the primary self-resonant coil 221 of the power transmitting device 200, the resonance frequency of the primary self-resonant coil 221 and secondary self-resonant coil 111, etc.

The capacitor 112 is connected to the opposite ends of the secondary self-resonant coil 111, and cooperates with the secondary self-resonant coil 111 to form an LC resonance circuit. The capacitance of the capacitor 112 is appropriately set, according to the inductance of the secondary self-resonant coil 111, so as to provide a given resonance frequency. If the floating capacitance of the secondary self-resonant coil 111 itself provides a desired resonance frequency, the capacitor 112 may be omitted.

The secondary coil 113 is provided on the same axis as the secondary self-resonant coil 111, and can be magnetically coupled to the secondary self-resonant coil 111 by electromagnetic induction. The secondary coil 113 takes out electric power received by the secondary self-resonant coil 111 by electromagnetic induction, and delivers the electric power to the rectifier 180.

The rectifier 180 rectifies the AC power received from the secondary coil 113, and delivers the resulting DC power to the power storage device 190 via the CHR 170. The rectifier 180 may include, for example, a diode bridge and a smoothing capacitor (both of which are not illustrated). As the rectifier 180, a so-called switching regulator that rectifies electric power using switching control may be used. The rectifier 180 may be included in the power receiving unit 110. The rectifier 180 is preferably a static rectifier, such as a diode bridge rectifier, so as to prevent malfunction of a switching device due to a generated electromagnetic field, for example.

In this embodiment, the DC power as a result of rectification by the rectifier 180 is directly delivered to the power storage device 190. If the DC voltage after rectification is different from the charging voltage permitted by the power storage device 190, a DC/DC converter (not shown) for converting voltage may be provided between the rectifier 180 and the power storage device 190.

A load resistor 173 for position detection and a relay 174, which are connected in series, are connected to an output portion of the rectifier 180. Before actual charging is started, a weak electric power is transmitted as a test signal from the power transmitting device 200 to the vehicle 100. At this time, the relay 174 is controlled according to a control signal SE3 from the vehicle ECU 300, and is brought into a conduction state.

The voltage sensor 172 is provided between a pair of power lines that connect the rectifier 180 with the power storage device 190. The voltage sensor 172 detects the secondary DC voltage of the rectifier 180, namely, the voltage of the electric power received from the power transmitting device 200, and outputs the detection value VC to the vehicle ECU 300. The vehicle ECU 300 determines the power receiving efficiency based on the voltage VC, and transmits information concerning the power receiving efficiency to the power transmitting device via the communication unit 160.

The current sensor 171 is provided in the power line that connects the rectifier 180 with the power storage device 190. The current sensor 171 detects the charging current to the power storage device 190, and outputs the detection value IC to the vehicle ECU 300.

The CHR 170 is electrically connected to the rectifier 180 and the power storage device 190. The CHR 170 is controlled according to a control signal SE2 from the vehicle ECU 300, and switches between supply of electric power from the rectifier 180 to the power storage device 190 and shutoff of the electric power.

The power storage device 190 is an electric power storage element capable of charge and discharge. The power storage device 190 includes a secondary battery, such as a lithium-ion battery, nickel-metal-hydride battery, or a lead storage battery, or a storage device, such as an electric double layer capacitor.

The power storage device 190 is connected to the rectifier 180 via the CHR 170. The power storage device 190 stores electric power received by the power receiving unit 110 and rectified by the rectifier 180. The power storage device 190 is also connected to the PCU 120 via the SMR 115. The power storage device 190 supplies electric power for generating vehicle driving force to the PCU 120. Further, the power storage device 190 stores electric power generated by the motor generator 130. The output of the storage device 190 is, for example, about 200V.

Although not illustrated in the drawings, the power storage device 190 is provided with a voltage sensor for detecting the voltage VB of the storage device 190 and a current sensor for detecting current 1B flowing into or out of the storage device 190. These detection values are transmitted to the vehicle ECU 300. The vehicle ECU 300 calculates the state of charge (which will also be called "SOC") of the storage device 190, based on the voltage VB and current 1B.

The SMR 115 is inserted in the power lines connecting the power storage device 190 with the PCU 120. The SMR 115 is controlled according to a control signal SE1 from the vehicle ECU 300, and switches between supply of electric power between the power storage device 190 and the PCU 120 and shutoff of the electric power.

Although not illustrated in the drawings, the PCU 120 includes a converter and an inverter. The converter is controlled according to a control signal PWC from the vehicle ECU 300, to convert a voltage from the power storage device 190. The inverter is controlled according to a control signal PWI from the vehicle ECU 300, to drive the motor generator 130 using electric power converted by the converter.

The motor generator 130 is an AC rotating electrical machine, for example, a permanent magnet type synchronous electric motor including a rotor in which a permanent magnet is embedded.

The output torque of the motor generator 130 is transmitted to the drive wheels 150 via the power transmission gear 140, and runs the vehicle 100. During regenerative braking of the vehicle 100, the motor generator 130 is able to generate electric power, using rotary force of the drive wheels 150. The electric power thus generated is converted by the PCU 120 into charging power for charging the power storage device 190.

In a hybrid vehicle on which an engine (not shown) as well as the motor generator 130 is installed, the engine and the motor generator 130 are operated in a coordinated manner, so as to generate required vehicle driving force. In this case, the power storage device 190 may be charged with electric power generated due to revolution of the engine.

The communication unit 160 is a communications interface that permits wireless communications between the vehicle 100 and the power transmitting device 200, as described above. The communication unit 160 outputs battery information INFO including the SOC of the power storage device 190, which was received from the vehicle ECU 300, to the power transmitting device 200. Also, the communication unit 160 outputs signals STRT, STP as commands for starting and stopping transmission of electric power from the power transmitting device 200, to the power transmitting device 200.

The vehicle ECU 300 includes a CPU (Central Processing Unit), a storage device, and input and output buffers, all of which are not illustrated in FIG. 7. The vehicle ECU 300 receives signals from various sensors, etc., and generates control signals to various devices, so as to control the vehicle 100 and the devices. These controls are not limitedly performed by software, but may be performed with an exclusive hardware (electronic circuit).

When the vehicle ECU 300 receives a charging start signal TRG generated through a user's operation, for example, the ECU 300 generates a signal STRT as a command for starting power transmission, to the power transmitting device 200, via the communication unit 160, when a certain condition(s) is/are satisfied. Also, the vehicle ECU 300 generates a signal STP as a command for stopping power transmission, to the power transmitting device 200, via the communication unit 160, when the power storage device 190 is fully charged, or through a user's operation, for example.

The antenna 102 and the receiver 104 receive broadcast waves or airwaves. The type of broadcasting is not particularly limited, but may include radio broadcasting and television broadcasting. The receiver 104 is one of wireless devices using wireless signals. In one embodiment, the receiver 104 receives radio broadcast waves via the antenna 102. The radio broadcasting may be AM (Amplification Modulation) broadcasting, or FM (Frequency Modulation) broadcasting. The receiver 104 is operated by the user.

Although not illustrated in the drawings, the receiver 104 includes a tuner. If the user operates the tuner to designate a broadcasting station, the tuner selects a signal having a frequency corresponding to that of the broadcasting station, from signals received from the antenna 102. The tuner also demodulates the selected signal. The user may directly set the receiving frequency of the tuner.

The power transmitting device 200 includes a plug-in station 210, and the power transmitting unit 220. The plug-in station 210 includes a power transmission ECU 240 as a controller, a power supply unit 250, a display 242, a fee receiving unit 246, an antenna 262, and a receiver 264, in addition to the communication unit 230. The power transmitting unit 220 includes a coil 221 (which will be called "primary self-resonant coil 221", or may also be called "resonance coil" when appropriate), a capacitor 222, and a primary coil 223.

The power supply unit 250 is controlled according to a control signal MOD from the power transmission ECU 240, and converts electric power received from an AC power source, such as a commercial power supply, into high-frequency electric power. Then, the power supply unit 250 supplies the resulting high-frequency electric power to the primary coil 223. The power supply unit 250 changes its operating frequency, in accordance with the control signal MOD from the power transmission ECU 240. In this manner, the frequency of the high-frequency electric power generated from the power supply unit 250 is changed.

In FIG. 7, no matching box that performs impedance conversion is not described. However, a matching box may be provided between the power supply unit 250 and the power transmitting unit 220, or between the power receiving unit 110 and the rectifier 180.

The primary self-resonant coil 221 transfers electric power by electromagnetic resonance, to the secondary self-resonant coil 111 included in the power receiving unit 110 of the vehicle 100.

The number of turns of the primary self-resonant coil 221 and the distance between the coils are appropriately set, so that the Q value indicative of the strength of the resonance between the primary self-resonant coil 221 and the secondary self-resonant coil 111 becomes large (for example, Q>100), and the coupling coefficient (κ) indicative of the degree of coupling becomes small, based on the distance from the secondary self-resonant coil 111 of the vehicle 100, the resonance frequency of the primary self-resonant coil 221 and secondary self-resonant coil 111, etc. The coupling coefficient κ is, for example, about 0.3 or smaller, preferably, 0.1 or smaller. As a matter of course, the coupling coefficient κ may be selected from values within the range of about 0.1 to 0.3. The coupling coefficient κ is not limited to such values, but may be selected from various values that assure good power transmission.

The capacitor 222 is connected to the opposite ends of the primary self-resonant coil 221, and cooperates with the primary self-resonant coil 221 to form an LC resonance circuit. The capacitance of the capacitor 222 is appropriately set, according to the inductance of the primary self-resonant coil 221, so as to provide a given resonance frequency. If a desired resonance frequency is obtained by the floating capacitance of the primary self-resonant coil 221 itself, the capacitor 222 may be omitted.

The primary coil 223 is provided on the same axis as the primary self-resonant coil 221, and can be magnetically coupled to the primary self-resonant coil 221 by electromagnetic induction. The primary coil 223 transmits high-frequency electric power supplied via a matching box, to the primary self-resonant coil 221, by electromagnetic induction.

The communication unit 230 is a communications interface that permits wireless communications between the power transmitting device 200 and the vehicle 100, as described above. The communication unit 230 receives battery information INFO transmitted from the communication unit 160 of the vehicle 100, and signals STRT, SIP as commands to start and stop power transmission, and outputs these items of information to the power transmission ECU 240.

Prior to charging, cash, a prepaid card, a credit card, or the like, is inserted into the fee receiving unit 246. The power transmission ECU 240 transmits a test signal in the form of a weak electric power to the power supply unit 250. Here, the "weak electric power" may be electric power that is smaller than the charging power used for charging the battery after authentication, or electric power transmitted for positioning, and may include intermittently transmitted electric power.

The antenna 262 and the receiver 264 have substantially the same functions as the antenna 102 and the receiver 104. The receiver 264 scans receiving frequencies within frequency bands that are predetermined as frequency bands of radio broadcasts. Namely, the receiver 264 performs a frequency searching operation. The receiver 264 continuously or discretely scans receiving frequencies, and outputs signals corresponding to the receiving frequencies. The power transmission ECU 240 detects the strength (receiving strength) of each signal from the receiver 264. In this manner, the power transmission ECU 240 obtains information concerning frequencies of broadcast waves that can be received at a position where the power transmitting device 200 is installed. In this embodiment, the information concerning frequencies of broadcast waves that can be received at the position of installation of the power transmitting device 200 is called "frequency information".

The vehicle ECU 300 sends control signals SE2, SE3 to place the relay 174 in the ON state and place the CHR 170 in the OFF state, so as to receive a test signal. Then, the vehicle ECU 300 calculates the power receiving efficiency and charging efficiency based on the voltage VC. The vehicle ECU 300 sends the calculated charging efficiency or power receiving efficiency to the power transmitting device 200 via the communication unit 160.

The display 242 of the power transmitting device 200 displays the charging efficiency and a unit price of charging power corresponding to the charging efficiency. The display 242 also functions as an input unit like a touch panel, for example, and is able to accept entry of information as to whether the user accepts the unit price of charging power.

The power transmission ECU 240 causes the power supply unit 250 to start actual charging when the unit price of charging power is accepted. Once the charging is completed, the user pays for the fee at the fee receiving unit 246.

The power transmission ECU 240 include a CPU, a storage device, and input and output buffers, all of which are not illustrated in FIG. 7. The power transmission ECU 240 receives signals from various sensors, etc., and generates control signals to various devices, so as to control the devices at the plug-in station 210. These controls are not limitedly performed by software, but may be performed with an exclusive hardware (electronic circuit).

For power transmission from the power transmitting device 200 to the vehicle 100, the relationship between the power transmitting unit 90 and the power receiving unit 91 as described above with reference to FIG. 3 and FIG. 4 is satisfied. In the power transfer system of FIG. 7, a difference between the natural frequency of the power transmitting unit 220 and the natural frequency of the power receiving unit 110 is equal to or smaller than ±10% of the natural frequency of the power transmitting unit 220 or the natural frequency of the power receiving unit 110. The power transmission efficiency can be enhanced by setting the natural frequencies of the power transmitting unit 220 and the power receiving unit 110 to within the above-indicated range. On the other hand, if the difference in the natural frequency becomes larger than ±10%, the power transmission efficiency becomes smaller than 10%, and the power transmission time is undesirably prolonged.

The vehicle 100, which communicates with the power transmitting device 200, further includes a display 142 that displays a result of determination as to whether the power transmitting unit 220 is compatible with the power receiving unit 110 of the vehicle 100.

The power transmission ECU 240 sets the transmission frequency of the power transmitting device 200, based on the frequency information. More specifically, the power transmission ECU 240 sets the transmission frequency, so that one of the transmission frequency and the broadcast frequency differs from an integer (or whole-number) multiple of the other frequency.

The "transmission frequency" is defined as a frequency associated with an operation of the power transmitting device when the power transmitting device transmits electric power to the power receiving device. In this embodiment, the "transmission frequency" is equal to the operating frequency of the power supply unit 250. However, the transmission frequency is not limited to this. For example, the resonance frequency may be defined as the "transmission frequency".

The operation of the power supply unit 250 may cause noise to arise from the power supply unit 250. The noise may be a harmonic wave. Harmonic waves have frequencies that are integer multiples of the frequency of the fundamental wave. If the transmission frequency is equal to or lower than a certain broadcast frequency, the frequency of harmonic noise may coincide with the frequency of the broadcast frequency. Also, the transmission frequency itself may coincide with the frequency of the broadcast wave.

The power transmission ECU 240 sets the transmission frequency so that the frequencies as integer multiples of the transmission frequency differ from the frequencies of broadcase waves. As described above, the frequencies as integer multiples of the transmission frequency include the frequencies of harmonic noises. By setting the transmission frequency so that the frequencies of harmonic noises differ from the frequencies of the broadcase waves, it is possible to reduce an influence of the noises on receiving of the broadcase waves at the receiver 104 of the vehicle 100.

In another embodiment, the power supply unit 250 may set the transmission frequency in view of the possibility of occurrence of subharmonic noises. A subharmonic wave has an n-th part (where n=integer) of the frequency of the fundamental wave. If the broadcast frequency is equal to or lower than the transmission frequency, and the power supply unit 250 generates subharmonic noise, the frequency of the subharmonic noise may coincide with the frequency of a certain broadcast wave. It may also be possible that the transmission frequency itself coincides with the frequency of the broadcast wave.

In this case, the power transmission ECU 240 sets the transmission frequency so that the frequencies of integer multiples of broadcast waves differ from the transmission frequency. For example, the transmission frequency is set so that the frequency of an n-th part (where n is an integer equal to or larger than 1) of the transmission frequency differs from the broadcast frequencies. In this case, too, it is possible to reduce an influence on receiving of the broadcast waves at the receiver 104 of the vehicle 100.

In the following, the case where the transmission frequency is equal to or lower than the broadcast frequencies, and the power supply unit 250 may generate noise will be described.

Figure 8:
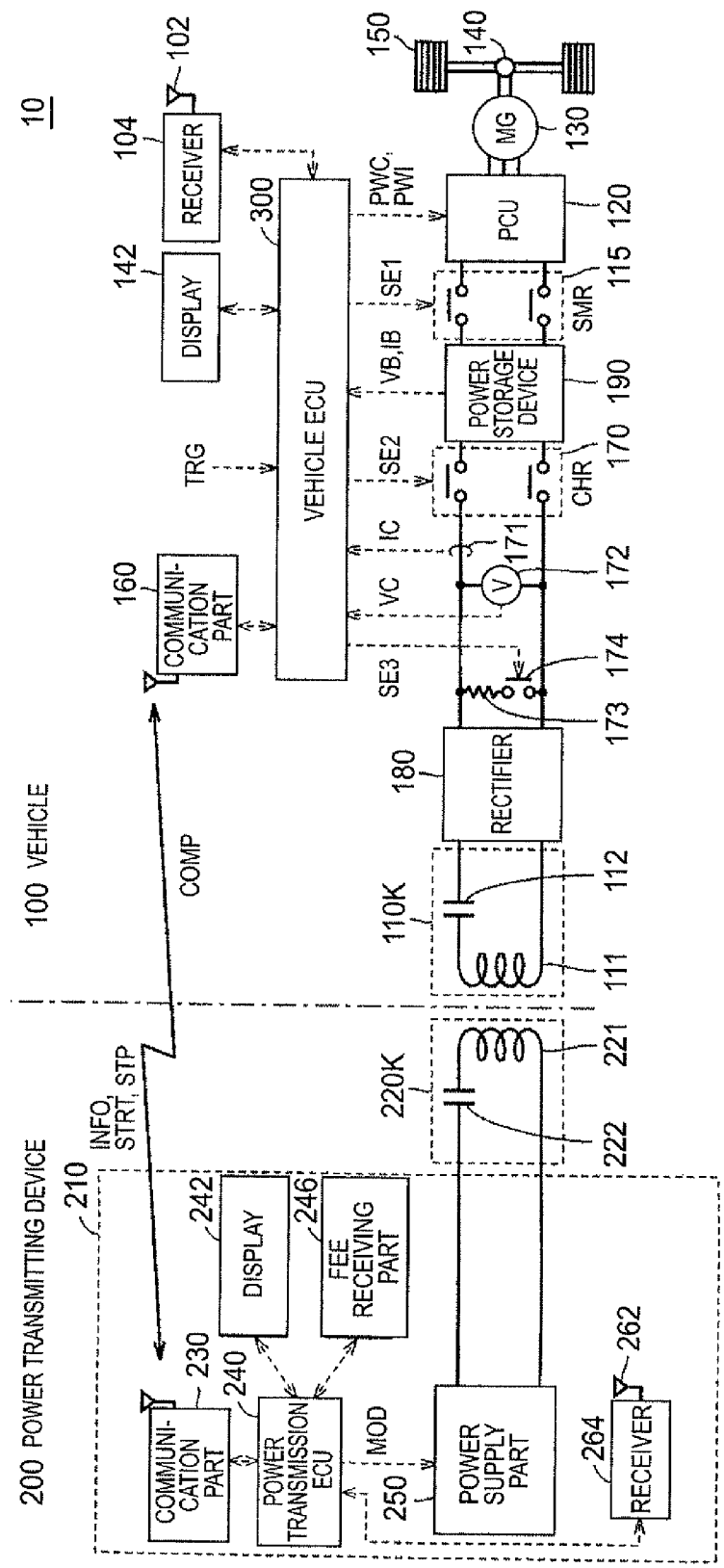
FIG. 8 is a view showing a modified example of power transmitting unit and power receiving unit.

FIG. 8 shows a modified example of power transmitting unit and power receiving unit. As shown in FIG. 8, the electromagnetic induction coils 113, 223 of FIG. 7 may not be interposed. In the arrangement of FIG. 8, a power transmitting unit 220K is provided in the power transmitting device 200, and a power receiving unit 110K is provided in the vehicle 100.

The power transmitting unit 220K includes a self-resonant coil 221 connected to the power supply unit 250, and a capacitor 222 connected to the power supply unit 250 in series with the self-resonant coil 221.

The power receiving unit 110K includes a self-resonant coil 121 connected to the rectifier 180, and a capacitor 112 connected to the rectifier 180 in series with the self-resonant coil 121.

The arrangement of other portions of the system of FIG. 8 is substantially identical with that of the above-described arrangement of FIG. 7, and therefore, will not be repeatedly explained.

Figure 9:
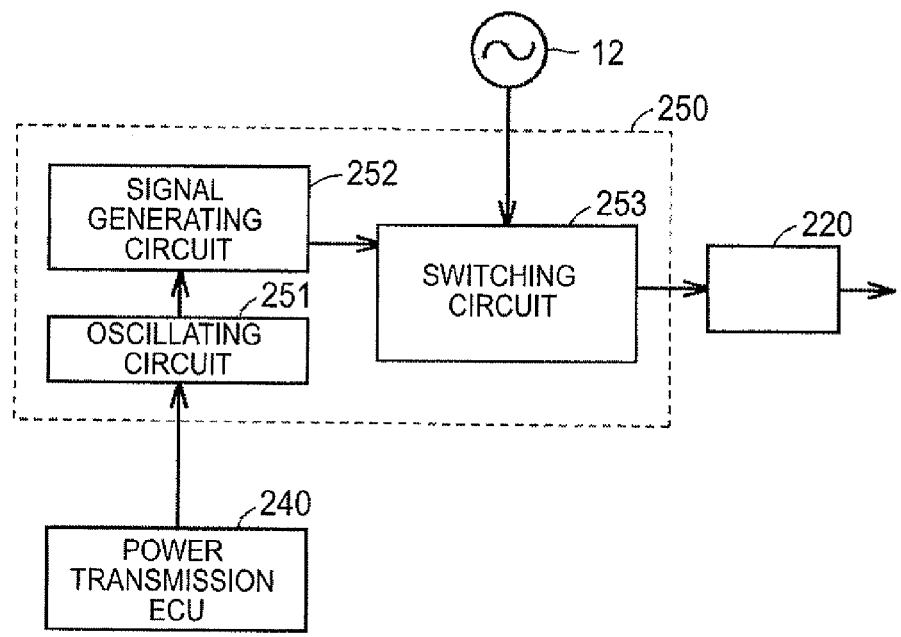
FIG. 9 is a view showing one example of the configuration of a power supply unit shown in FIG. 7 and FIG. 8.

FIG. 9 shows one example of the configuration of the power supply unit 250 shown in FIG. 7 and FIG. 8. Referring to FIG. 9, the power supply unit 250 includes an oscillating circuit 251, a signal generating circuit 252, and a switching circuit 253. The oscillation frequency of the oscillating circuit 251 is variable. The oscillation frequency is controlled by the power transmission ECU 240.

The signal generating circuit 252 generates a signal for driving the switching circuit 253, on the basis of the oscillation frequency of the oscillating circuit 251. The frequency of the signal generated by the signal generating circuit 252 depends on the oscillation frequency of the oscillating circuit 251.

The switching circuit 253 performs a switching operation, in accordance with the signal from the signal generating circuit 252. The switching circuit 253 converts AC power from the power supply 12, to electric power having a higher frequency. For example, the switching circuit 253 includes a class D amplifier.

In this embodiment, the transmission frequency of the power transmitting device 200 is equal to the switching frequency of the power supply unit 250. The switching frequency is determined by the oscillation frequency of the oscillating circuit 251. Thus, the transmission frequency of the power transmitting device 200 is changed by changing the oscillation frequency.

The oscillation frequency of the oscillating circuit 251 may be fixed, and an impedance matching circuit may be connected to the output of the power supply unit 250. With this arrangement, the power transmission ECU 240 can change the transmission frequency of the power transmitting device 200, by adjusting the impedance of the impedance matching circuit.

As shown in FIG. 9, the switching circuit 253 is operated, so as to generate high-frequency power. In the meantime, harmonic noise may arise from the power supply unit 250.

Figure 10:
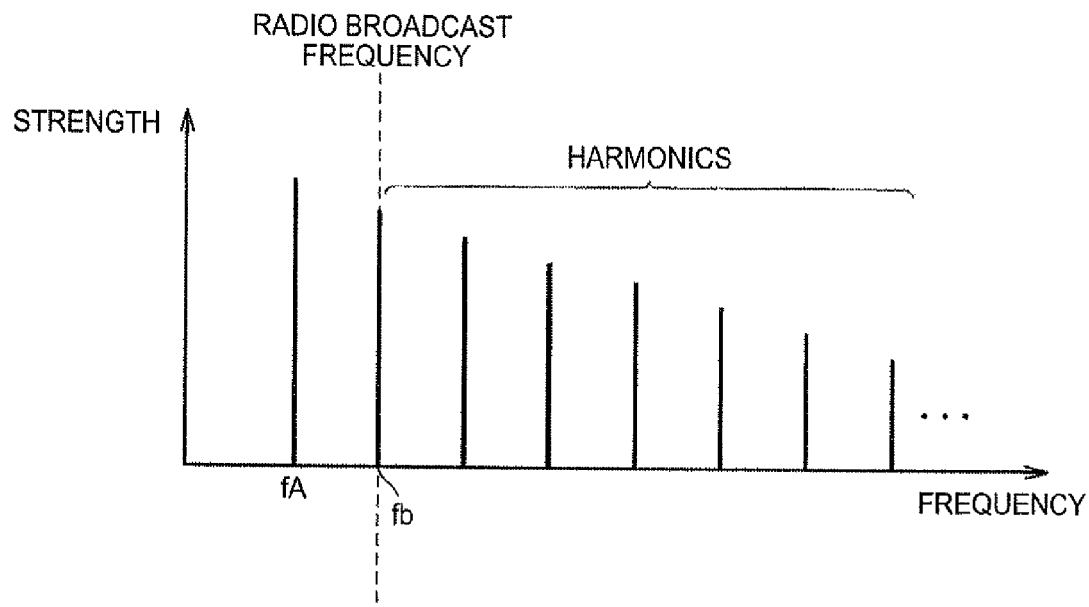
FIG. 10 is a schematic waveform diagram useful for explaining a problem caused by harmonic noise.

FIG. 10 is a schematic waveform diagram useful for explaining a problem caused by harmonic noise. Referring to FIG. 10, frequency fa represents the transmission frequency. As shown in FIG. 10, when electric power is delivered from the power transmitting device 200, spurious noise may largely occur. In this case, the spurious noise is mainly harmonic noise.

The frequency fb represents the frequency of harmonic noise of a certain order. The frequency fb coincides with the frequency of a particular radio broadcast wave. In this case, when the user causes the receiver 104 of the vehicle 100 to receive the radio broadcast, the harmonic noise is highly likely to have an influence on the operation of the receiver 104. For example, noise is included in the reproduced voice.

According to the first embodiment, the power transmission ECU 240 controls the receiver 264, so as to search for frequencies of radio broadcast waves that can be received at a position where the power transmitting device 200 is installed. In this manner, the power transmission ECU 240 obtains frequency information. Then, the power transmission ECU 240 sets the transmission frequency so that the frequencies of harmonic noises differ from the frequencies of the radio broadcast waves. Namely, the power transmission ECU 240 sets the transmission frequency so that the frequencies of integer multiples of the transmission frequency differ from the frequencies of the broadcast waves.

By making the frequencies of the harmonic noises different from the frequencies of the radio broadcase waves, it is possible to reduce an influence of power transmission by the power transmitting device 200 on the operation of the receiver 104. If radio broadcasting of a certain broadcasting station uses a certain frequency band, it is preferable to set the transmission frequency so that the frequencies of harmonic noises deviate from the frequency band used by the broadcasting.

The frequencies of integer multiples of the transmission frequency can be unlimitedly calculated. In this embodiment, the upper limit of the number of multiples of the transmission frequency is determined in advance, for example, so that it can be determined whether the frequencies of integer multiples of the transmission frequency are different from the frequencies of the broadcast waves. The upper limit is determined by measuring the spectrum of harmonic noise generated from the power transmitting device in an experiment, for example. The harmonic noise having a larger strength than a predetermined reference level is specified as noise that may affect the operation of the receiver. The upper limit of the number of multiples of the transmission frequency can be determined by specifying the order of the harmonic noise thus specified.

At the position where the power transmitting device is installed, respective radio broadcasts provided by two or more broadcasting stations may be received. Accordingly, in another method, the frequencies of multiples of the transmission frequency may be compared with a broadcast frequency of a broadcase wave having the highest frequency. The upper limit of the number of multiples of the transmission frequency may be determined, based on the noise frequency that is closest to the highest frequency of the broadcase wave.

Figure 11:
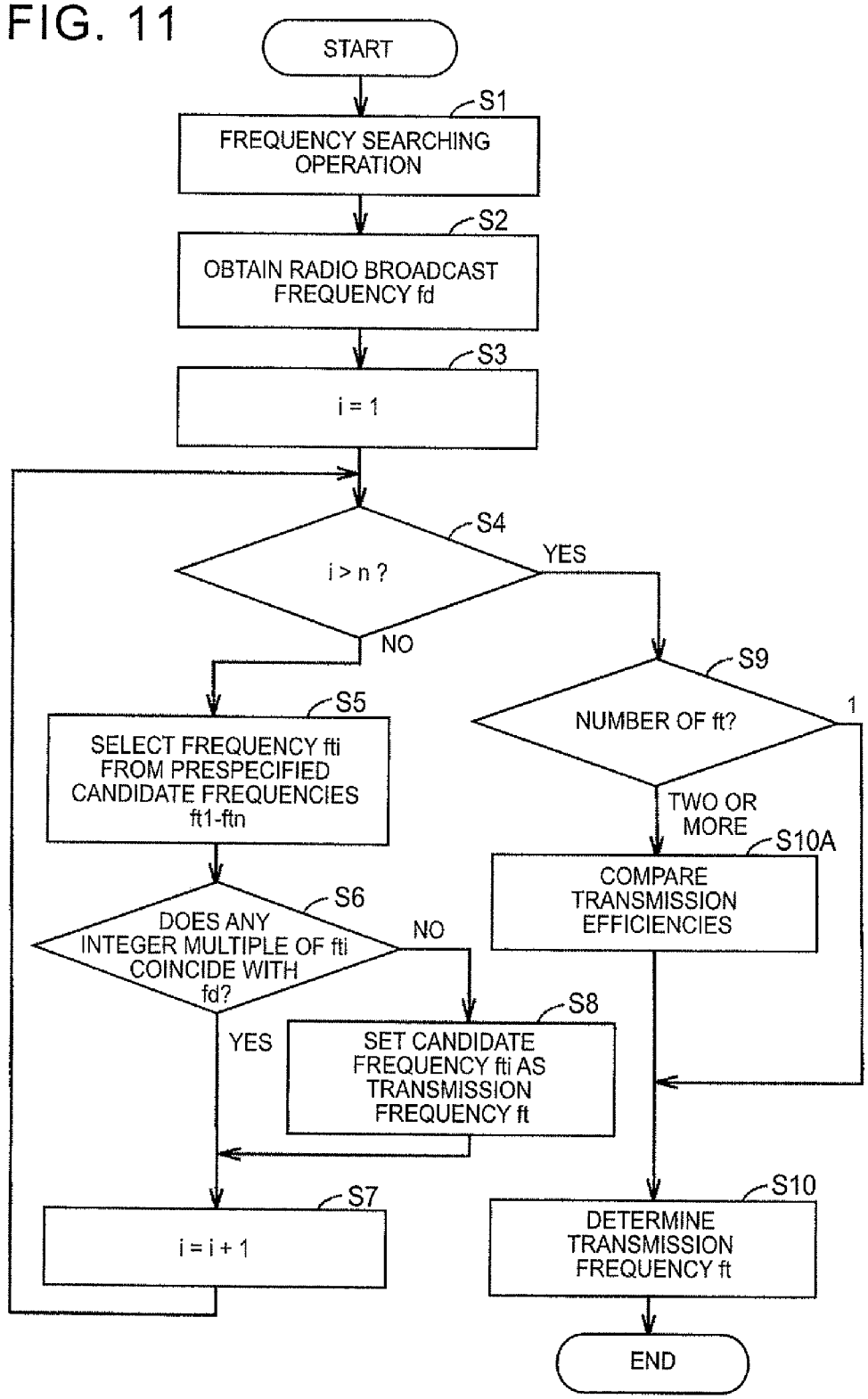
FIG. 11 is a flowchart illustrating a process of setting a transmission frequency, according to the first embodiment of the invention.

FIG. 11 is a flowchart illustrating a process of setting the transmission frequency, according to the first embodiment of the invention. Referring to FIG. 11, this process is started when the power transmitting device 200 (power supply unit 250) starts being operated. The process shown in FIG. 11 is executed mainly by the power transmission ECU 240.

In step S1, the power transmission ECU 240 performs a frequency searching operation. More specifically, the power transmission ECU 240 controls the receiver 264 so as to change the receiving frequency of the receiver 264. The receiver 264 scans receiving frequencies within frequency bands allotted to radio broadcasts, for example.

In step S2, the power transmission ECU 240 obtains a radio broadcast frequency fd. The power transmission ECU 240 receives a signal from the receiver 264, and obtains frequency information about radio broadcast frequencies available at a position where the power transmitting device 200 is installed. More specifically, the frequency information include information indicative of the frequency fd.

In step S2, a frequency band including the center frequency fd may be calculated. The bandwidth of the frequency band is determined in advance.

In step S3, the power transmission ECU 240 sets variable i to 1. The variable i is used for selecting one frequency from n (=an integer equal to or larger than 2) candidate frequencies ft1-ftn. The power transmission ECU 240 prepares prespecified n candidate frequencies ft1-ftn. The timing of preparing the frequencies ft1-ftn is not particularly limited. For example, the frequencies ft1-ftn may be prepared in step S3. In another example, the power transmission ECU 240 prepares the frequencies ft1-ftn at the same time that the process shown in FIG. 11 is started.

In step S4, it is determined whether variable i is larger than n. If variable is equal to or smaller than n (NO in step S4), the control proceeds to step S5.

In step S5, the power transmission ECU 240 selects a frequency fti from the prespecified candidate frequencies ft1-ftn, using variable i. In step S6, the power transmission ECU 240 determines whether the frequencies of integer multiples of the frequency fti coincide with the radio broadcast frequency fd. The frequencies of integer multiples of the frequency fti correspond to harmonic noise frequencies.

If any of the frequencies of integer multiples of the frequency fti coincides with the radio broadcast frequency fd (YES in step S6), the control proceeds to step S7. In step S7, the power transmission ECU 240 adds 1 to variable i (i=i+1). After step S7, the control returns to step S4.

If none of the frequencies of integer multiples of the frequency fti coincides with the radio broadcast frequency fd (NO in step S6), the control proceeds to step S8. In step S8, the power transmission ECU 240 sets the frequency fti selected in step S5, as a transmission frequency ft. After the operation of step S8, step S7 is executed. After step S7, the control returns to step S4.

If variable i is larger than n in step S4 (YES in step S4), the control proceeds to step S9. In step S9, the power transmission ECU 240 determines whether the number of frequencies ft set in step S8 is equal to or larger than two. If the number of ft is 1, the control proceeds to step S10. In step S10, the power transmission ECU 240 determines the frequency ft as the transmission frequency ft.

If the number of ft is two or larger, the control proceeds to step S10A. In step S10A, the power transmission ECU 240 compares the transmission efficiencies corresponding to the respective frequencies ft. The power transmission ECU 240 selects a frequency that provides the highest transmission efficiency, from the two or more frequencies ft. In step S10, the power transmission ECU 240 determines the selected frequency as the transmission frequency ft. If the operation of step S10 is completed, the whole process ends.

Figure 12:
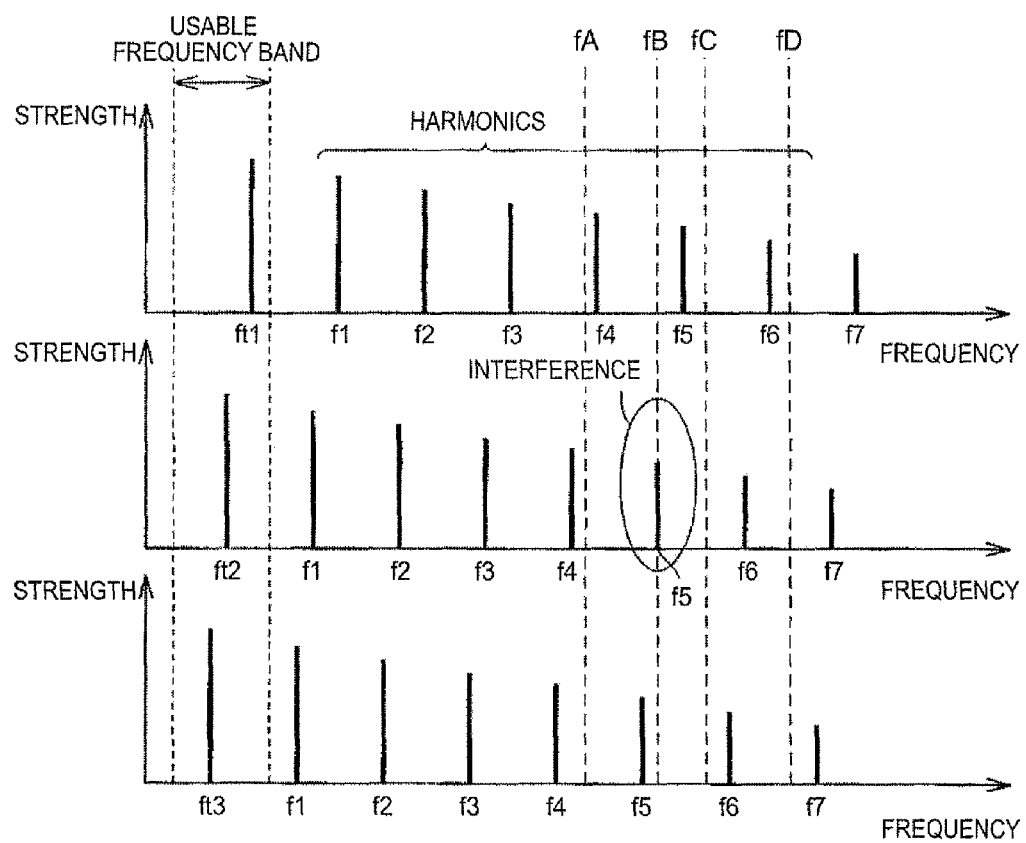
FIG. 12 is a schematic view useful for explaining the process shown in FIG. 11.

FIG. 12 is a schematic view useful for explaining the process shown in FIG. 11. Referring to FIG. 11 and FIG. 12, each of frequencies fA, fB, fC, fD is obtained as the radio broadcast frequency fd through the frequency searching operation (steps S1, S2). Frequencies ft1, ft2, ft3 are selected from within a frequency band that can be used as a transmission frequency band. The frequencies ft1-ft3 are prespecified candidate frequencies. Conditions under which the frequencies ft1, ft2, ft3 are selected are not particularly limited. In this case, n is equal to 3.

Then, variable i is set to 1 (step S3). In this case, i is smaller than n (=3) (NO in step S4). In step S5, the frequency ft1 is selected.

In step S6, it is determined whether the frequencies of integer multiples of the frequency ft1 coincide with any of the frequencies fA, fB, fC, fD. As shown in FIG. 12, frequencies f1-f7 are calculated as frequencies of integer multiples of the frequency ft1 (namely, harmonic noise frequencies). Initially, it is determined whether the noise frequency f1 coincides with any of the frequencies fA, fB, fC, fD. The noise frequency f1 does not coincide with any of the frequencies fA, fB, fC, fD. Then, it is determined whether the noise frequency f2 coincides with any of the frequencies fA, fB, fC, fD. Similarly, the noise frequency f2 does not coincide with any of the frequencies fA, fB, fC, fD.

The above-described operation is performed on each of the frequencies f3-f7. As a result, none of the noise frequencies f1-f7 coincides with any one of the frequencies fA, fB, fC, fD. Accordingly, in step S8, the frequency ft1 is set as a transmission frequency ft.

Then, variable i is set to 2 (step S7). In this case, i is smaller than n (=3) (NO in step S4). Accordingly, in step S5, the frequency ft2 is selected.

In step S6, it is determined whether the frequencies of integer multiples of the frequency ft2 coincide with any of the frequencies fA, fB, fC, fD. In FIG. 12, f1-f7 are commonly used for denoting harmonic noise frequencies, with respect to any of the candidate frequencies fti, for the sake of easy understanding of changes in the harmonic noise frequencies due to changes in the frequency fti.

When the candidate frequency is ft2, the noise frequency f5 coincides with the frequency fB (YES in step S5). In this case, the control proceeds to step S7, to set variable i to 3. Namely, the frequency ft2 is not set as a transmission frequency.

The processing performed on the frequency ft3 is the same as the processing performed on the frequency ft1, and thus will not be explained again. None of the noise frequencies f1-f7 coincides with any one of the frequencies fA, fB, fC, fD. Thus, the frequency ft3 is set as a candidate transmission frequency ft (step S8).

Then, variable i is set to 4 (step S7). In this case, it is determined that i is larger than n (=3) (YES in step S4). The number of candidate frequencies (ft1, ft3) set as transmission frequencies is 2. Namely, the number of frequencies ft is two or more (step S9). Accordingly, the transmission efficiency in the case where the transmission frequency is ft1 is compared with the transmission efficiency in the case where the transmission frequency is ft3.

For example, the transmission frequency may be set by using the relationship between the power transmission efficiency and the air gap AG as shown in FIG. 5. For example, the air gap AG is measured. The power transmission ECU 240 derives the relationship between the power transmission efficiency and the frequency, which is associated with the measured air gap, or an air gap close to the measured air gap, using the relationship as shown in FIG. 5. By referring to the relationship thus derived, the power transmission ECU 240 selects the frequency that provides the highest transmission efficiency as the transmission frequency, from the two or more candidate frequencies. For example, the transmission efficiency in the case where the transmission frequency is ft1 is higher than the transmission efficiency in the case where the transmission frequency is ft3. In this case, the frequency ft1 is determined as the transmission frequency (step S10).

According to the first embodiment, the power transmitting device searches for radio broadcast frequencies that can be received at the position where the power transmitting device is installed. Then, the power transmitting device sets the transmission frequency so that the frequencies (noise frequencies) of integer multiples of the transmission frequency do not overlap the radio broadcast frequencies. Thus, an influence on the receiver located close to the power receiving device can be reduced. Accordingly, when electric power is transmitted from the power transmitting device 200, an influence on receiving of broadcasts at a broadcasting receiver (receiver 104) around the power transmitting device 200 can be reduced.

The frequencies of radio broadcast waves that can be received depend on the position where the power transmitting device is installed. It is difficult to set the transmission frequency so that its noise frequencies differ from the radio broadcast frequencies, without depending on the installation position of the power transmitting device. According to the first embodiment, the transmission frequency can be set after installation of the power transmitting device. Accordingly, the transmission frequency can be set so that the noise frequencies differ from the radio broadcast frequencies.

Figure 13:
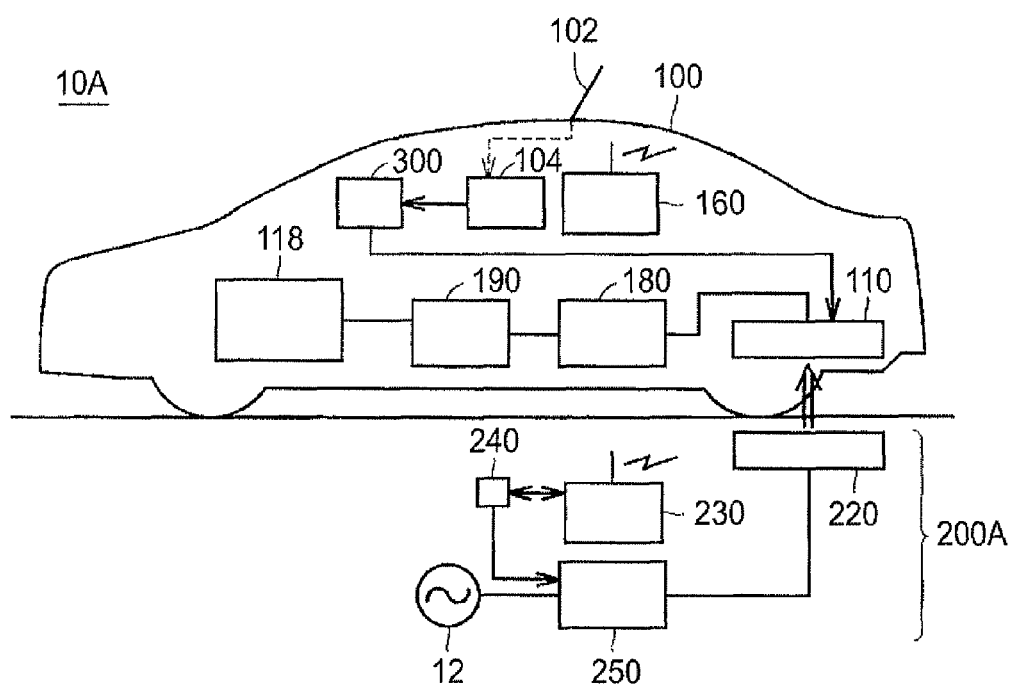
FIG. 13 is an overall block diagram showing one example of contactless power transmitting and receiving system according to a second embodiment of the invention.
Figure 14:
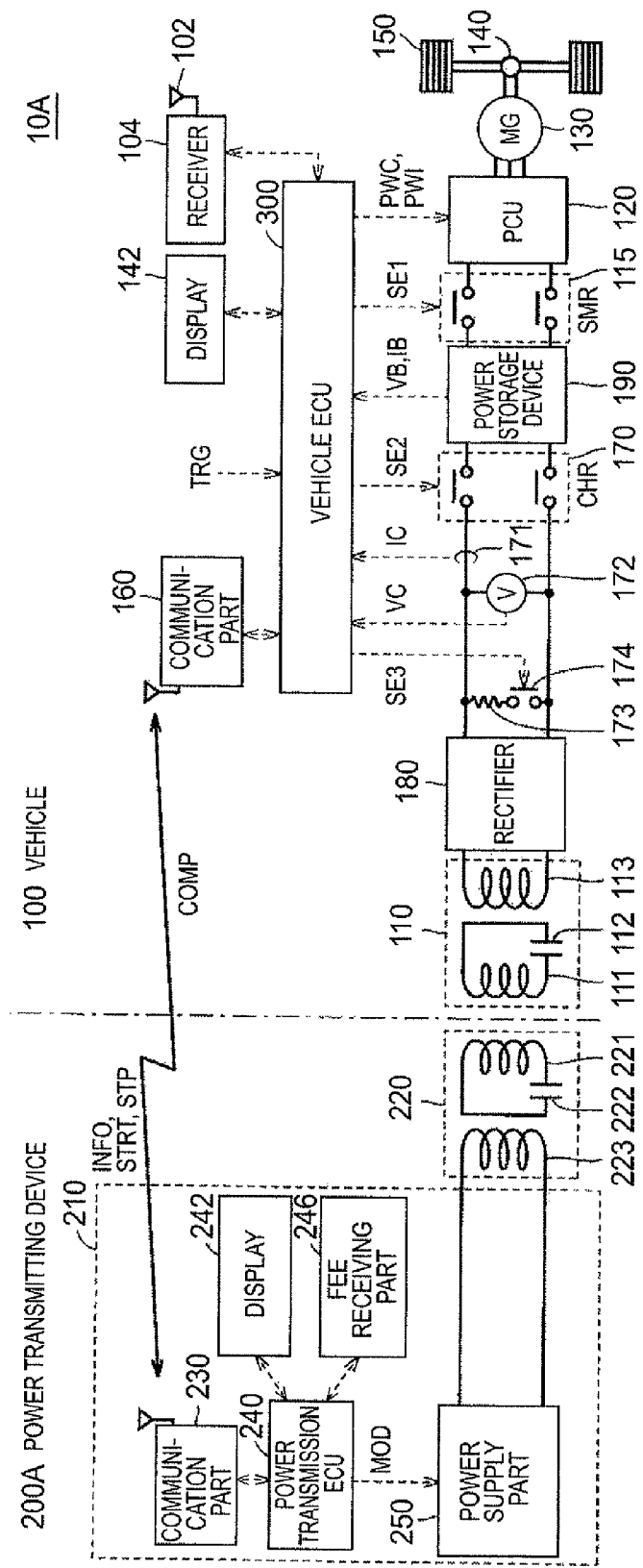
FIG. 14 is a circuit diagram showing the detailed configuration of the contactless power transmitting and receiving system shown in FIG. 13.

[Second Embodiment] FIG. 13 is an overall block diagram showing one example of a contactless power transmitting and receiving system according to a second embodiment of the invention. FIG. 14 is a circuit diagram showing the detailed configuration of the contactless power transmitting and receiving system 10A shown in FIG. 13. Referring to FIG. 13 and FIG. 14, the contactless power transmitting and receiving system 10A includes a power transmitting device 200A and a vehicle 100. The power transmitting device 200A is different from the power transmitting device 200 (see FIG. 1 and FIG. 7) in that the antenna 262 and the receiver 264 are not provided in the power transmitting device 200A. The arrangement of other portions of the contactless power transmitting and receiving system 10A is substantially identical with that of corresponding portions of the contactless power transmitting and receiving system 10, and therefore, will not be repeatedly explained.

In the second embodiment, the vehicle ECU 300 searches for radio broadcast frequencies. More specifically, the vehicle ECU 300 receives a signal from the receiver 104 while scanning the receiving frequencies of the receiver 104. The vehicle ECU 300 obtains information of broadcast frequencies associated with received radio broadcasts, based on the strength of the signal from the receiver 104.

Figure 15:
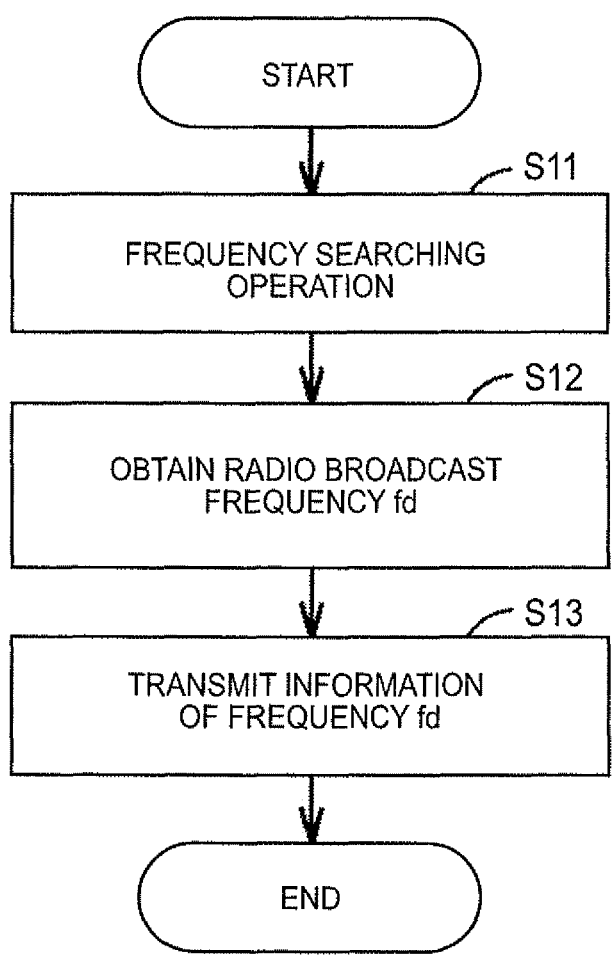
FIG. 15 is a flowchart illustrating a process according to which the vehicle obtains frequency information, according to the second embodiment of the invention.

FIG. 15 is a flowchart useful for explaining a process performed by the vehicle 100 for obtaining frequency information, according to the second embodiment of the invention. This process is executed before electric power starts being transmitted from the power transmitting device 200A to the vehicle 100. For example, communications are established between the power transmitting device 200A and the vehicle 100 before electric power starts being transmitted from the power transmitting device 200A to the vehicle 100. At this time, the process illustrated in FIG. 15 is executed. The process illustrated in FIG. 15 may be executed while the vehicle 100 is being moved (for example, the vehicle 100 is approaching the power transmitting device 200A), or while the vehicle 100 is stopped or at rest. With the frequency searching operation performed in the above timing, the radio broadcasts that can be received at the vehicle 100 correspond to radio broadcasts that can be received at a position of the power transmitting device 200A.

Referring to FIG. 14 and FIG. 15, the vehicle ECU 300 performs the frequency searching operation in step S11. More specifically, the vehicle ECU 300 controls the receiver 104, so as to change the receiving frequency of the receiver 104. The receiver 104 scans receiving frequencies within frequency bands allotted to radio broadcasts, for example.

In step S12, the vehicle ECU 300 obtains a radio broadcast frequency fd. The operation of step S12 is similar to that of step S2 shown in FIG. 1I, and therefore will not be repeatedly explained.

In step S13, the vehicle ECU 300 transmits information of the frequency fd (frequency information) to the power transmitting device 200A. More specifically, the vehicle ECU 300 outputs the information of the frequency fd to the communication unit 160. The communication unit 160 transmits the information to the power transmitting device 200A by means of a wireless signal.

The operations of steps S11, S12 may be performed by utilizing the auto tuning function of the receiver 104. For example, the receiver 104 is turned to a prestored receiving frequency. When the strength of a broadcast signal having the receiving frequency falls below a reference value, the process of FIG. 15 is executed. In this case, step S13 is executed when electric power starts being transmitted from the power transmitting device 200A to the vehicle 100.

Figure 16:
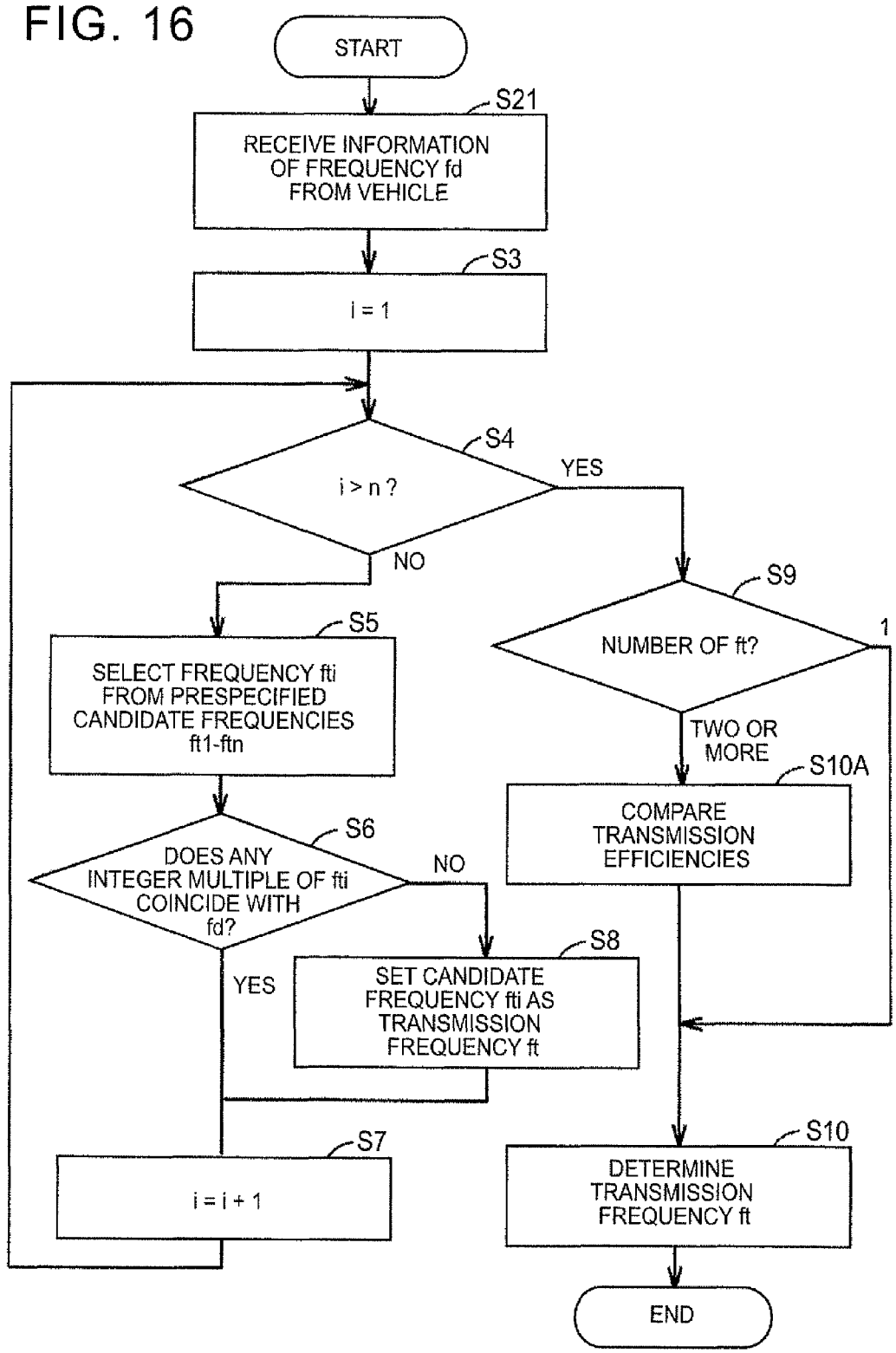
FIG. 16 is a flowchart showing a process of setting a transmission frequency, according to the second embodiment of the invention.

FIG. 16 is a flowchart illustrating a process of setting the transmission frequency according to the second embodiment of the invention. Referring to FIG. 11 and FIG. 16, in the second embodiment, step S21 is executed in place of steps S1, S2. In this respect, the process of setting the transmission frequency according to the second embodiment is different from the process of setting the transmission frequency according to the first embodiment.

In step S21, the power transmission ECU 240 receives information of the radio broadcast frequency fd from the vehicle 100. More specifically, the communication unit 230 receives a wireless signal from the vehicle, thereby to receive frequency information from the vehicle 100. The communication unit 230 transmits the frequency information to the power transmission ECU 240. The power transmission ECU 240 obtains frequency information concerning the frequency fd from the communication unit 230. Steps subsequent to step S21 are substantially identical with corresponding steps shown in FIG. 11, and therefore, will not be repeatedly explained. The power transmission ECU 240 prepares frequencies ft1-ftn as candidate transmission frequencies when the process of FIG. 16 is started.

According to the second embodiment, when electric power is transmitted from the power transmitting device 200A, an influence on receiving of broadcasting at a broadcasting receiver (receiver 104) around the power transmitting device 200A can be reduced, as in the first embodiment. Further, in the second embodiment, the configuration or arrangement of the power transmitting device can be simplified as compared with that of the first embodiment.

Figure 17:
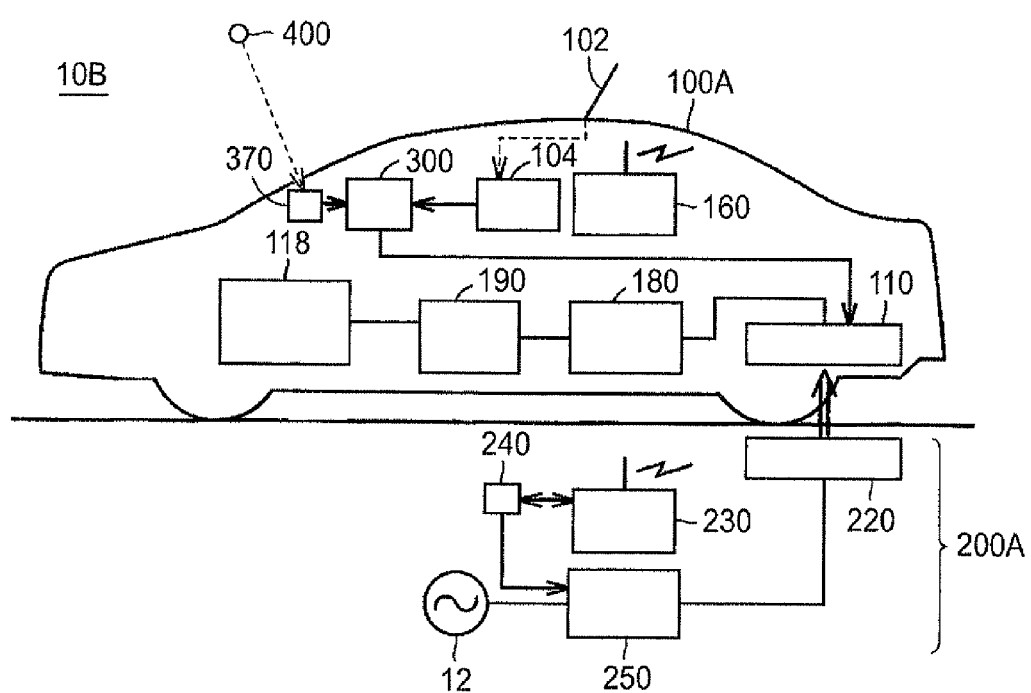
FIG. 17 is an overall block diagram showing one example of contactless power transmitting and receiving system according to a third embodiment of the invention.
Figure 18:
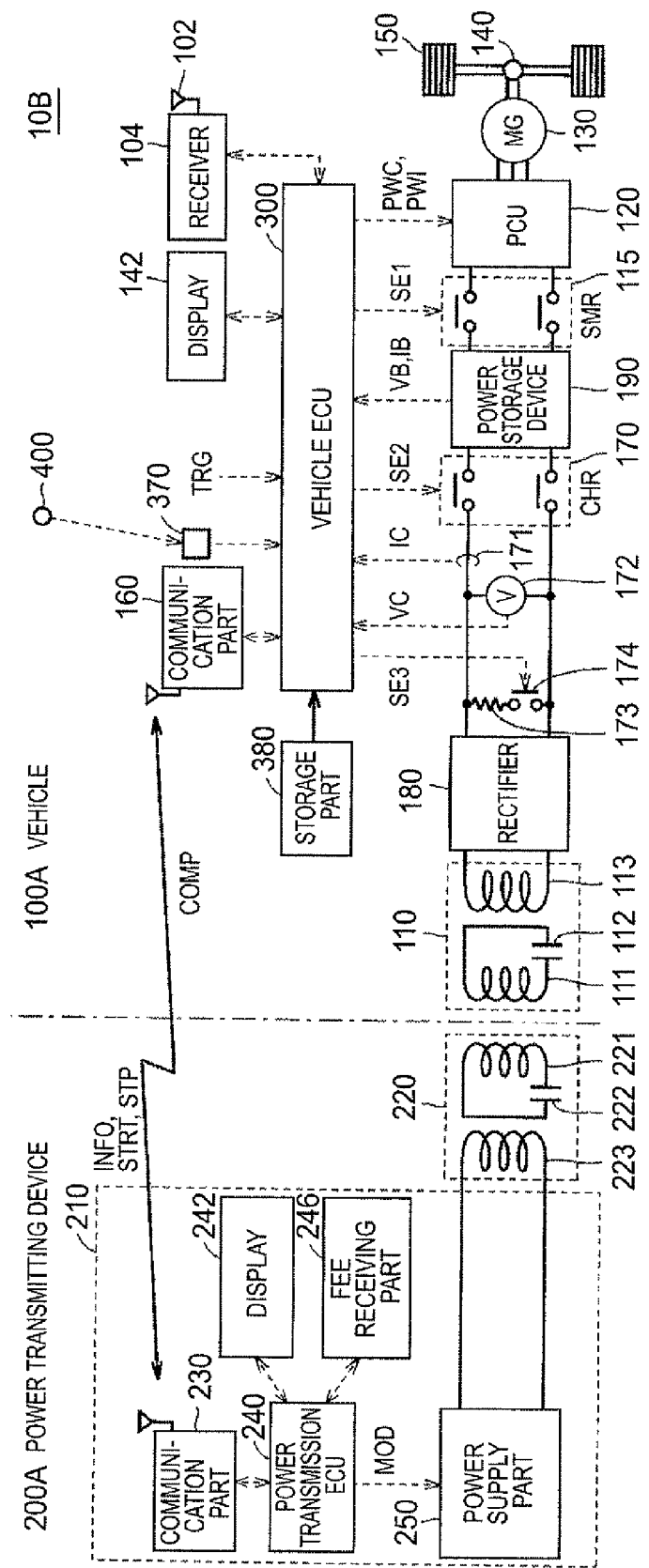
FIG. 18 is a circuit diagram showing the detailed configuration of the contactless power transmitting and receiving system shown in FIG. 17.

[Third Embodiment] FIG. 17 is an overall block diagram showing one example of a contactless power transmitting and receiving system according to a third embodiment of the invention. FIG. 18 is a circuit diagram showing the detailed configuration of the contactless power transmitting and receiving system 10B shown in FIG. 17. The contactless power transmitting and receiving system according to the third embodiment will be described, by comparison with that of the second embodiment.

Referring to FIG. 17 and FIG. 18, the contactless power transmitting and receiving system 10B includes a power transmitting device 200A and a vehicle 100A. The vehicle 100A is different from the vehicle 100 in that the vehicle 100A further includes a GPS (Global Positioning System) receiving unit 370, and a storage unit 380. The arrangement of other portions of the contactless power transmitting and receiving system 10B is substantially identical with that of corresponding portions of the contactless power transmitting and receiving system 10A, and therefore, will not be repeatedly explained.

The GPS receiving unit 370 receives radio waves from a GPS satellite 400. Generally, the GPS receiving unit receives radio waves from a plurality of GPS satellites, so as to obtain positional information. However, in FIG. 17 and FIG. 18 (and other drawings which will be described later), only one satellite is illustrated for the sake of easy understanding. The GPS receiving unit 370 provides a positional information obtaining unit that obtains positional information concerning the position of the vehicle 100A on which the power receiving device is installed.

The vehicle ECU 300 receives a signal from the GPS receiving unit 370, to grasp the current position of the vehicle 100A. The storage unit 380 stores, in advance, a table in which positional information is associated with frequencies. The vehicle ECU 300 obtains information of radio broadcast frequencies, using the information of the current position and the table.

In the system as shown in FIG. 18, the table is stored in advance in the storage unit 380. However, the vehicle ECU 300 may obtain a table via a communications line (not shown), for example.

Figures 19, 20:
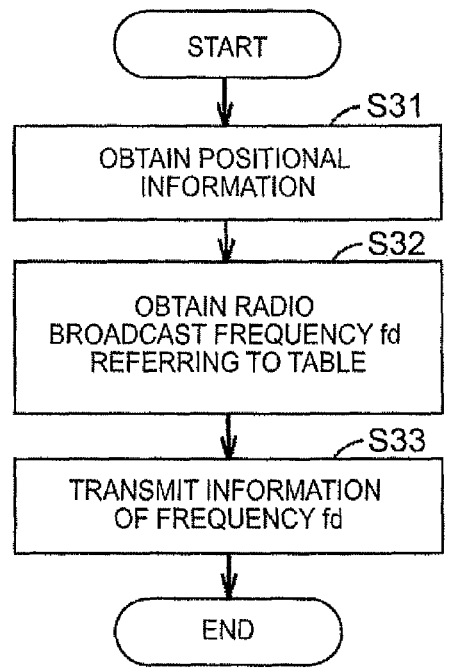
FIG. 19 is a view showing one example of table used for obtaining frequency information, in the third embodiment of the invention.
FIG. 20 is a flowchart useful for explaining a process according to which the vehicle obtains frequency information, according to the third embodiment of the invention.

FIG. 19 shows one example of table used for obtaining frequency information, in the third embodiment of the invention. Referring to FIG. 19, each region is associated with radio broadcasting stations, and the correspondence relationship is registered in the table. Further, the respective broadcasting stations are associated with frequencies.

FIG. 20 is a flowchart useful for explaining a process performed by the vehicle 100A for obtaining frequency information, according to the third embodiment of the invention. This process is executed before electric power starts being transmitted from the power transmitting device 200A to the vehicle 100A, for example. The timing expressed as "before electric power starts being transmitted" is the same as the timing used in the second embodiment.

Referring to FIG. 18 and FIG. 20, in step S31, the vehicle ECU 300 receives a signal from the GPS receiving unit 370, so as to obtain positional information concerning the current position of the vehicle 100A. This operation can be performed by a known method, and therefore, will not be described in detail.

In step S32, the vehicle ECU 300 obtains radio broadcast frequencies fd. More specifically, the vehicle ECU 300 reads the table (see FIG. 19) from the storage unit 380. The vehicle ECU 300 determines the region corresponding to the current position, from the table, and the positional information obtained in step S31. The vehicle ECU 300 determines broadcasting stations corresponding to the region, referring to the table, and obtains information about the frequencies (frequencies fd) of the broadcasting stations.

In step S33, the vehicle ECU 300 transmits the information of the frequencies fd (frequency information) to the power transmitting device 200A. This process is similar to that of step S13 shown in FIG. 15, and therefore, will not be repeatedly explained.

The power transmitting device 200A sets the power transmission frequency, according to the flowchart illustrated in FIG. 16.

According to the third embodiment, when electric power is transmitted from the power transmitting device 200A, an influence on receiving of broadcasting at a broadcasting receiver (receiver 104) around the power transmitting device 200A can be reduced, as in the first embodiment. Like the second embodiment, according to the third embodiment, the configuration or arrangement of the power transmitting device can be simplified as compared with that of the first embodiment. Further, according to the third embodiment, the process of searching for frequencies of radio broadcasts by means of the receiver is not required. Accordingly, the length of time required to prepare for electric power transmission from the power transmitting device to the power receiving device can be shortened.

The method of obtaining positional information in the vehicle 100A is not limited to the above-described method. For example, information for specifying the current position of the vehicle 100A may be entered into the vehicle ECU 300. The information may include, for example, the postal code, ZIP code, telephone number, and/or address. The table shown in FIG. 19 may be arranged so that radio broadcast frequencies can be specified based on the information.

Figure 21:
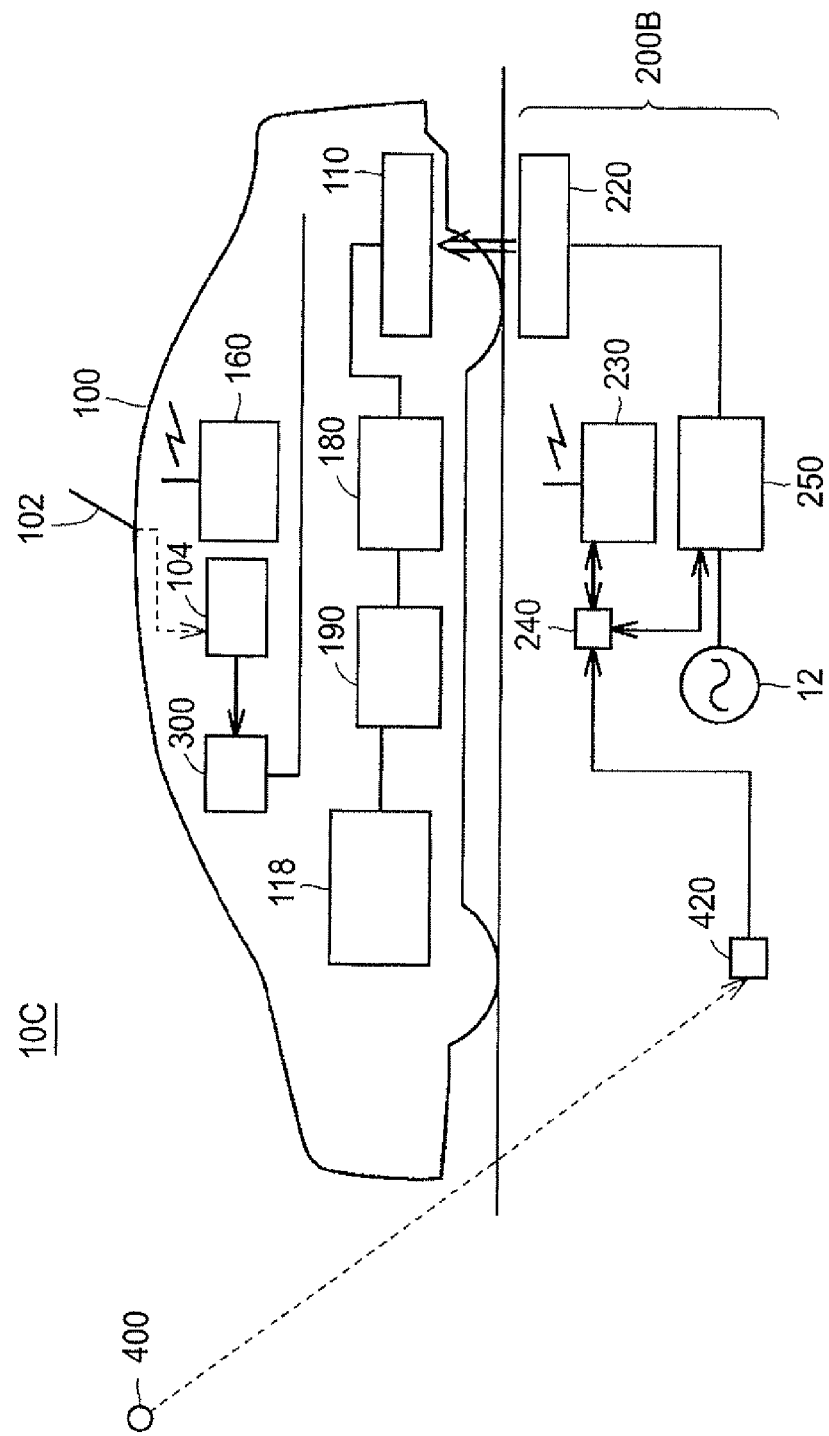
FIG. 21 is an overall block diagram showing one example of contactless power transmitting and receiving system according to a fourth embodiment of the invention.
Figure 22:
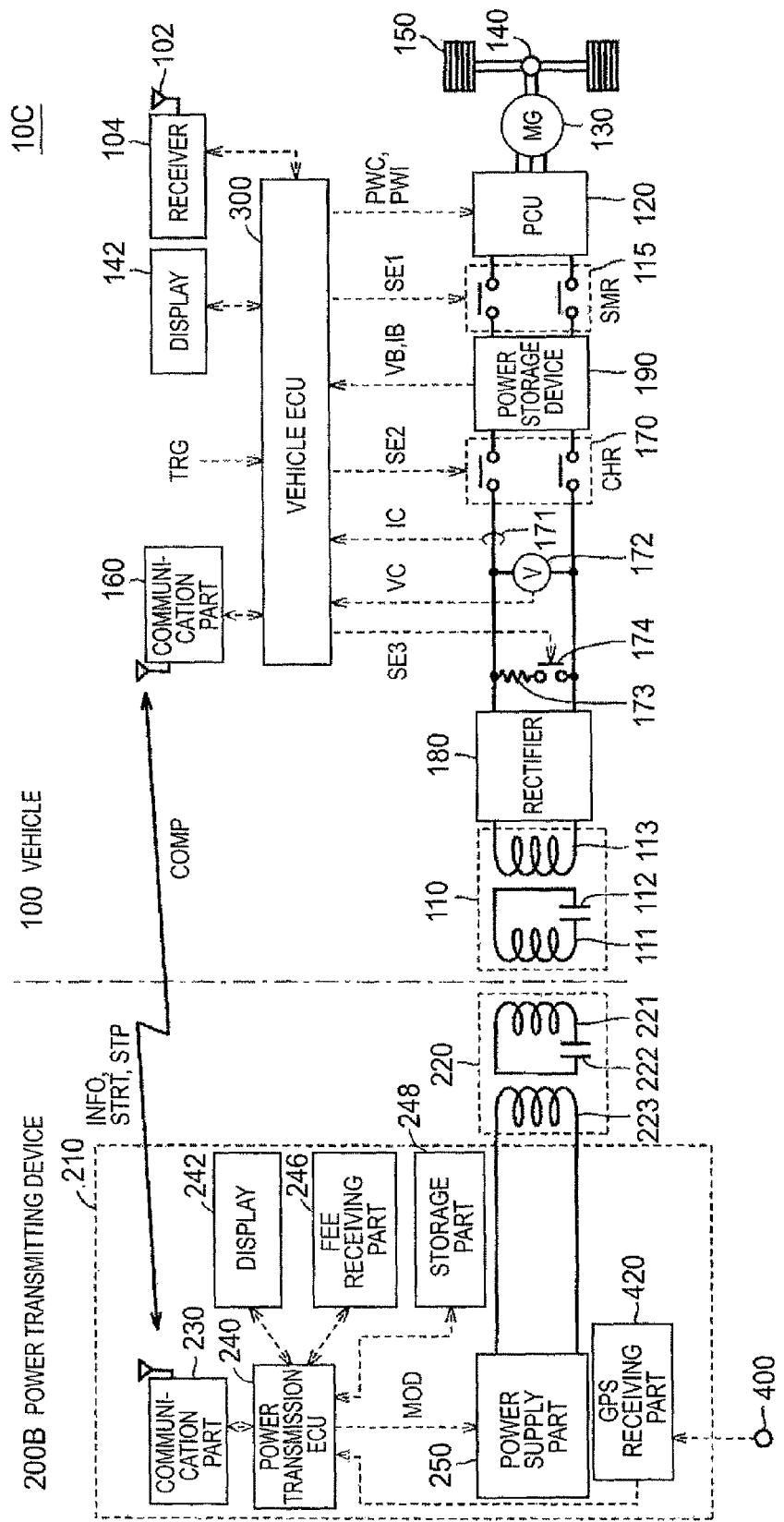
FIG. 22 is a circuit diagram showing the detailed configuration of the contactless power transmitting and receiving system shown in FIG. 21.

[Fourth Embodiment] FIG. 21 is an overall block diagram showing one example of contactless power transmitting and receiving system according to a fourth embodiment of the invention. FIG. 22 is a circuit diagram showing the detailed configuration of the contactless power transmitting and receiving system 10C shown in FIG. 21.

Referring to FIG. 21 and FIG. 22, the contactless power transmitting and receiving system 10C includes a power transmitting device 200B and a vehicle 100. The construction of the vehicle 100 is identical with that of the vehicle according to the first embodiment. The power transmitting device 200B is different from the power transmitting device 200A (see FIG. 18) in that the power transmitting device 200B further includes a GPS receiving unit 420, and a storage unit 248.

The GPS receiving unit 420 and the storage unit 248 have the same functions as the GPS receiving unit 370 and the storage unit 380 shown in FIG. 18. The GPS receiving unit 420 receives radio waves from a UPS satellite 400. The power transmission ECU 240 receives a signal from the GPS receiving unit 420, so as to grasp the current position of the power transmitting device 200B. In this embodiment, the GPS receiving unit 420 provides a positional information obtaining unit that obtains positional information concerning the position of the power transmitting device 200B.

The storage unit 248 stores, in advance, a table in which the positional information is associated with frequencies. In one embodiment, the arrangement of the table is identical with that of the table shown in FIG. 19. The power transmission ECU 240 obtains information of radio broadcast frequencies, using the obtained positional information and the table. Like the third embodiment, the power transmission ECU 240 may obtain the table via a communications line (not shown).

FIG. 23 is a flowchart illustrating a process of setting the transmission frequency, according to the fourth embodiment of the invention. This process is started when the power transmitting device 200E (power supply unit 250) starts being operated. The process illustrated in FIG. 23 is executed mainly by the power transmission ECU 240.

Referring to FIG. 11 and FIG. 23, in the fourth embodiment, steps S41, S42 are executed in place of steps S1, S2. In step S41, the power transmission ECU 240 receives a signal from the GPS receiving unit 420, so as to obtain positional information indicating the current position of the power transmitting device 200B. This operation is similar to the operation performed by the vehicle ECU 300 in step S31 (see FIG. 20).

In step S42, the power transmission ECU 240 obtains radio broadcast frequencies fd. More specifically, the power transmission ECU 240 reads the table (see FIG. 19) from the storage unit 248. The power transmission ECU 240 determines a region corresponding to the current position, from the table, and the positional information obtained in step S41. The power transmission ECU 240 determines broadcasting stations corresponding to the region, referring to the table, and obtains information about the frequencies (frequencies fd) of the broadcasting stations. The power transmission ECU 240 prepares frequencies ft1-ftn as candidate transmission frequencies when the process of FIG. 23 is started, for example.

Then, step S3 is executed. The operations of step S3 and subsequent steps are substantially identical with those of the process illustrated in FIG. 11, and therefore, will not be repeatedly described.

According to the fourth embodiment, when electric power is transmitted from the power transmitting device 200B, an influence on receiving of broadcasting at a broadcasting receiver (receiver 104) around the power transmitting device 200B can be reduced, as in the first embodiment.

Basically, the power transmitting device is not relocated. Accordingly, in the first and fourth embodiments, the transmission frequency may be set only when the power transmitting device transmits electric power for the first time, so that the radio broadcast frequencies do not overlap the noise frequencies. In this case, the power transmitting device stores the transmission frequency. When electric power is transmitted for the second and subsequent times, the power transmitting device can transmit electric power to the power receiving device, using the stored transmission frequency.

In the second, third and fourth embodiments of the invention, the electromagnetic induction coils 113, 223 may be omitted, as in the arrangement shown in FIG. 8.

It is to be understood that the illustrated embodiments are merely exemplary in all respects, and not restrictive. The scope of the invention is defined by the appended claims, rather than the above description, and is intended to include all changes within the range of the claims and equivalents thereof.

What is claimed is:

1. A contactless power transmitting device that contactlessly transmits electric power to a power receiving device, comprising:
   a transmitter that transmits electric power at a transmission frequency which is variable; and
   a power transmission controller sets the transmission frequency, based on frequency information concerning a frequency of a broadcast wave transmitted from outside the contactless power transmitting device that is received at a position of the contactless power transmitting device,
   wherein:
   the power transmission controller sets the transmission frequency so that one of the transmission frequency and the frequency of the broadcast wave is different from an integer multiple of the other of the transmission frequency and the frequency of the broadcast wave;
   the contactless power transmitting device further includes a receiver that receives the broadcast wave; and
   the power transmission controller performs a frequency searching operation using the receiver, and determines the frequency information based on a strength of the broadcast wave received by the receiver.

2. The contactless power transmitting device according to claim 1, wherein the power transmission controller sets the transmission frequency so that a noise frequency corresponding to an integer multiple of the transmission frequency differs from the frequency of the broadcast wave.

3. A contactless power receiving device that contactlessly receives electric power transmitted from a power transmitting device, comprising:
   a power receiving controller that determines frequency information concerning a frequency of a broadcast wave transmitted from outside the contactless power receiving device that is at a position of the contactless power receiving device;
   a communication interface that transmits the frequency information obtained by the power receiving controller, to the power transmitting device; and
   a power receiver that contactlessly receives electric power transmitted from the power transmitting device at a transmission frequency determined according to the frequency information,
   wherein the transmission frequency is determined so that one of the transmission frequency and the frequency of the broadcast wave differs from an integer multiple of the other of the transmission frequency and the frequency of the broadcast wave; and
   a receiver that receives the broadcast wave,
   wherein the power receiving controller performs a frequency searching operation using the receiver, before the power transmitting device transmits electric power, and determines the frequency information based on a strength of the broadcast wave received by the receiver.

4. A vehicle comprising:
   the contactless power receiving device according to claim 3.

5. A contactless power transmitting and receiving system, comprising:
   a power transmitting device that transmits electric power at a transmission frequency which is variable; and
   a power receiving device that contactlessly receives electric power transmitted from the power transmitting device,
   wherein:
   the power transmitting device sets the transmission frequency, based on frequency information concerning a frequency of a broadcast wave transmitted from outside the contactless power transmitting and receiving system that is received at a position of the power transmitting device, so that one of the transmission frequency and the frequency of the broadcast wave differs from an integer multiple of the other of the transmission frequency and the frequency of the broadcast wave;
   the power transmitting device includes:
   a transmitter that transmits electric power at the transmission frequency;
   a power transmission controller that determines the frequency information, and sets the transmission frequency based on the frequency information; and
   a receiver that receives the broadcast wave; and
   the power transmission controller performs a frequency searching operation using the receiver, and determines the frequency information based on a strength of the broadcast wave received by the receiver.

6. The contactless power transmitting and receiving system according to claim 5, wherein the power transmission controller sets the transmission frequency so that a noise frequency corresponding to an integer multiple of the transmission frequency differs from the frequency of the broadcast wave.

7. A contactless power transmitting and receiving system, comprising:
   a power transmitting device that transmits electric power at a transmission frequency which is variable; and
   a power receiving device that contactlessly receives electric power transmitted from the power transmitting device,
   wherein:
   the power transmitting device sets the transmission frequency, based on frequency information concerning a frequency of a broadcast wave transmitted from outside the contactless power transmitting and receiving system that is received at a position of the power transmitting device, so that one of the transmission frequency and the frequency of the broadcast wave differs from an integer multiple of the other of the transmission frequency and the frequency of the broadcast wave;

the power transmitting device includes:

a transmitter that transmits electric power at the transmission frequency; and a power transmission controller that determines the frequency information, and sets the transmission frequency based on the frequency information;

the power receiving device includes:

a power receiving controller that determines the frequency information; and a first communication interface that transmits the frequency information obtained by the power receiving controller, to the power transmitting device; and the power transmitting device further includes a second communication interface that receives the frequency information transmitted from the first communication interface, and transmits the received frequency information to the power transmission controller; and a receiver that receives the broadcast wave; and the power receiving controller that performs a frequency searching operation using the receiver, and determines the frequency information based on a strength of the broadcast wave received by the receiver.

* * * * *